(12) United States Patent
Day, Jr.

(10) Patent No.: US 10,342,386 B2
(45) Date of Patent: Jul. 9, 2019

(54) METHOD AND APPARATUS FOR REPLICATING COFFEE FLAVOR

(71) Applicant: Neil M. Day, Jr., Portola Valley, CA (US)

(72) Inventor: Neil M. Day, Jr., Portola Valley, CA (US)

(73) Assignee: Blue Bottle Coffee, Inc., Oakland, CA (US)

( * ) Notice: Subject to any disclaimer, the term of this patent is extended or adjusted under 35 U.S.C. 154(b) by 995 days.

(21) Appl. No.: 14/205,044

(22) Filed: Mar. 11, 2014

(65) Prior Publication Data

US 2014/0263780 A1  Sep. 18, 2014

Related U.S. Application Data

(60) Provisional application No. 61/776,619, filed on Mar. 11, 2013.

(51) Int. Cl.
*A47J 42/38* (2006.01)
*A47J 31/44* (2006.01)
*A47J 31/42* (2006.01)

(52) U.S. Cl.
CPC ............ *A47J 42/38* (2013.01); *A47J 31/42* (2013.01); *A47J 31/4492* (2013.01)

(58) Field of Classification Search
CPC .. A47J 31/44; A47J 31/52; A47J 42/38; A47J 31/4492; A47J 31/42; A23F 5/26; A23F 3/18; Y10T 436/12
See application file for complete search history.

(56) References Cited

U.S. PATENT DOCUMENTS

| | | | |
|---|---|---|---|
| 2011/0256273 A1 | 10/2011 | de Graaff et al. | |
| 2012/0156337 A1* | 6/2012 | Studor | A47J 31/44 426/231 |
| 2012/0156339 A1* | 6/2012 | Studor | A47J 31/44 426/231 |
| 2012/0156343 A1* | 6/2012 | Studor | A47J 31/44 426/431 |
| 2012/0156344 A1* | 6/2012 | Studor | A47J 31/44 426/433 |
| 2014/0241590 A1* | 8/2014 | Day, Jr. | G01N 15/0205 382/110 |
| 2014/0282198 A1* | 9/2014 | Mayworm | G06F 3/04817 715/771 |
| 2014/0314921 A1* | 10/2014 | Kuempel | H04L 67/10 426/231 |

(Continued)

FOREIGN PATENT DOCUMENTS

| JP | 2004267540 A | 9/2004 |
|---|---|---|
| WO | 2001030173 A2 | 5/2001 |

(Continued)

*Primary Examiner* — Shogo Sasaki
(74) *Attorney, Agent, or Firm* — Kilpatrick Townsend & Stockton LLP

(57) ABSTRACT

A computer-implemented method for controlling brewing of a coffee drink and a computer-readable medium storing instructions to execute such a method are presented. The method entails receiving an identifier for the coffee drink, the identifier associated with a set of brew parameters used to make the coffee drink, and retrieving the set of brew parameters from a database storing the set of brew parameters using the identifier.

11 Claims, 13 Drawing Sheets

(56) References Cited

U.S. PATENT DOCUMENTS

| | | | | |
|---|---|---|---|---|
| 2015/0104546 A1* | 4/2015 | Mintus | ...................... | A23F 5/14 |
| | | | | 426/93 |
| 2015/0201796 A1* | 7/2015 | Kuempel | ................ | H04L 67/10 |
| | | | | 426/231 |
| 2015/0366234 A1* | 12/2015 | Kuempel | ................ | H04L 67/10 |
| | | | | 426/231 |
| 2016/0178539 A1* | 6/2016 | Santini | ............... | G01N 15/0227 |
| | | | | 382/110 |

FOREIGN PATENT DOCUMENTS

| WO | 2004064585 A1 | 8/2004 |
|---|---|---|
| WO | 2008142536 A1 | 11/2008 |

\* cited by examiner

METHOD AND APPARATUS FOR REPLICATING COFFEE FLAVOR

CROSS-REFERENCE TO RELATED APPLICATION(S)

This application claims the benefit of U.S. Provisional Application No. 61/776,619 filed on Mar. 11, 2013.

BACKGROUND

1. Field of the Invention

This invention relates to a method and apparatus for preparing a coffee drink and particularly to replicating a coffee drink of a desired flavor

2. Related Art

Coffee drinks are popular beverages in many parts of the world and have been consumed for thousands of years. A "coffee drink," as used herein, refers to a liquid that is prepared using coffee beans and water, often for consumption as a beverage. FIG. 1 shows a basic coffee brewing process 10 for preparing a coffee drink from roasted coffee beans. At S11, roasted coffee beans are ground into small pieces. Then, the ground coffee beans (coffee grounds) are placed in contact with hot water in a manner that allows the compounds in the coffee beans to be extracted into the water (S12). The solid grounds are separated from the liquid portion that ends up in the coffee drink (S13).

Numerous methods and devices exist for placing the ground coffee beans in contact with hot water (S12) and separating the remaining solid grounds (S13) to produce coffee drinks. Devices include, for example, percolators, vacuum pots, the French press, drip coffee makers, and espresso makers.

FIGS. 2A and 2B illustrate methods for preparing (S12 and S13) a coffee drink from the ground coffee beans using, respectively, a French press and an Aeropress® (Aerobie®, Inc.). FIG. 2C illustrates the principles for preparing (S12 and S13) espresso from ground coffee beans. In the French press device 21 of FIG. 2A, ground coffee beans (grounds) 2120 and hot water 2130 are mixed in a container 2110, e.g., a glass cylinder. The grounds 2120 and hot water 2130 are allowed to steep for a period of time. A plunger 2150 that includes a mesh filter 2170 is then pushed down through the liquid, catching the grounds 2120 and holding them at the bottom of the container 2110. The coffee drink 2180 in the container 2110 is above the filter 2170, separated from the grounds 2120 that are at the bottom.

In the AeroPress® device 22 of FIG. 2B, a filter 2220 is positioned over openings 2230 at the bottom of a cylindrical holder 2250. The grounds 2120 and hot water 2130 are mixed together and allowed to steep over the filter 2220 for a period of time. Then, a plunger 2260, which makes an airtight seal with the cylindrical holder 2250, is used to force the liquid 2280 (which is a coffee drink) through the filter 2220 into a receiving vessel 2290. The grounds 2120 are held above the filter 2220. The French press device 21 and AeroPress® device 22 differ in that pressure is applied in the AeroPress® to force the liquid past the ground coffee beans as it exits the cylindrical holder.

To make an espresso drink, as shown in FIG. 2C, the grounds 2120 are first compacted together to form a "puck" 2310. Hot water 2130 is then forced under high pressure through the contained puck 2310 into a receiving vessel 2320, to make the espresso-type coffee drink 2370. A wide variety of devices have been devised to make espresso coffee drinks 2370.

In the process for preparing coffee, as shown in FIG. 1, the roasted coffee beans are first ground (S11). The fineness or coarseness of the grind of the roasted coffee beans affects the flavor of the coffee drink obtained in S12 and S13, and the coarseness of the grind is typically matched to the method that will be used to brew the coffee. Brewing methods in which the coffee grounds are exposed to heated water for a relatively long period of time generally use a coarse grind. If the grind for such methods is too fine, then too much surface area of the coffee beans will be exposed to water for too long a time, and the resulting coffee will be over-extracted, producing a bitter taste. On the other hand, if the brewing method used exposes the ground coffee beans to the heated water for a short period, too coarse a grind will result in weak, tasteless coffee.

Additionally, because coffee beans are grown and roasted under a wide variety of conditions, each batch of roasted coffee beans may require different conditions to prepare high quality, flavorful coffee. Properly adjusting the fineness of the coffee grinds and other brewing parameters to achieve the desired flavor generally requires trial and error, and often a trained "barista." A way to predictably reproduce the desired coffee flavor without spending significant time and effort is desired.

SUMMARY

In one aspect, the inventive concept pertains to a computer-implemented method for controlling brewing of a coffee drink. The method entails providing instructions to receive an identifier for the coffee drink, the identifier associated with a set of brew parameters used to make the coffee drink; and retrieving the set of brew parameters from a database storing the set of brew parameters using the identifier.

In another aspect, the inventive concept pertains to a computer-readable medium storing instructions for controlling brewing of a coffee drink, the instructions including instructions to receive an identifier for the coffee drink, the identifier associated with a set of brew parameters used to make the coffee drink and including a grind size parameter; and to retrieve the set of brew parameters from a database storing the set of brew parameters using the identifier.

In yet another aspect of the inventive concept, the inventive concept pertains to a coffee grinder. The coffee grinder includes a grinder for grinding coffee beans; a grind control unit for controlling a ground size of the ground coffee beans; and a computer processor connected to the grind control unit.

DETAILED DESCRIPTION

Figure 1:
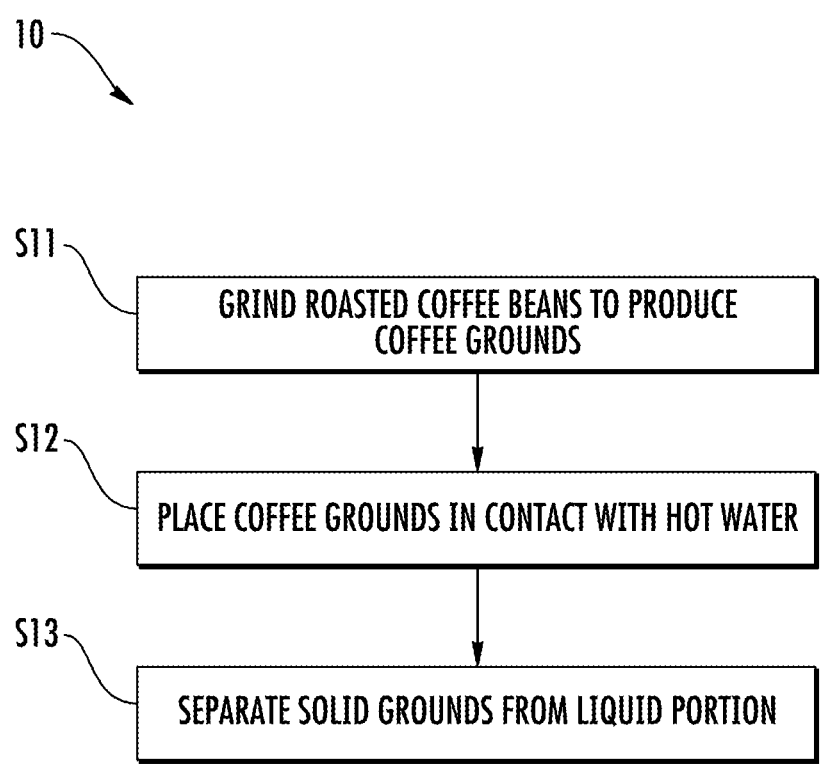
FIG. 1 is a flowchart depicting a basic coffee brewing process.
Figure 2A:
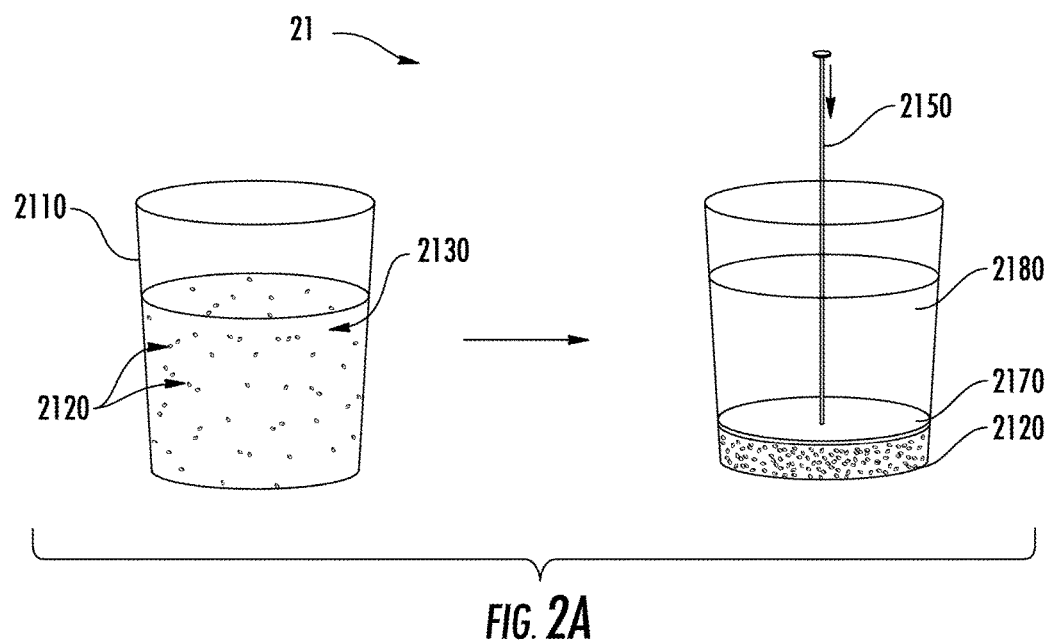
FIG. 2A illustrates a French press.
Figure 2B:
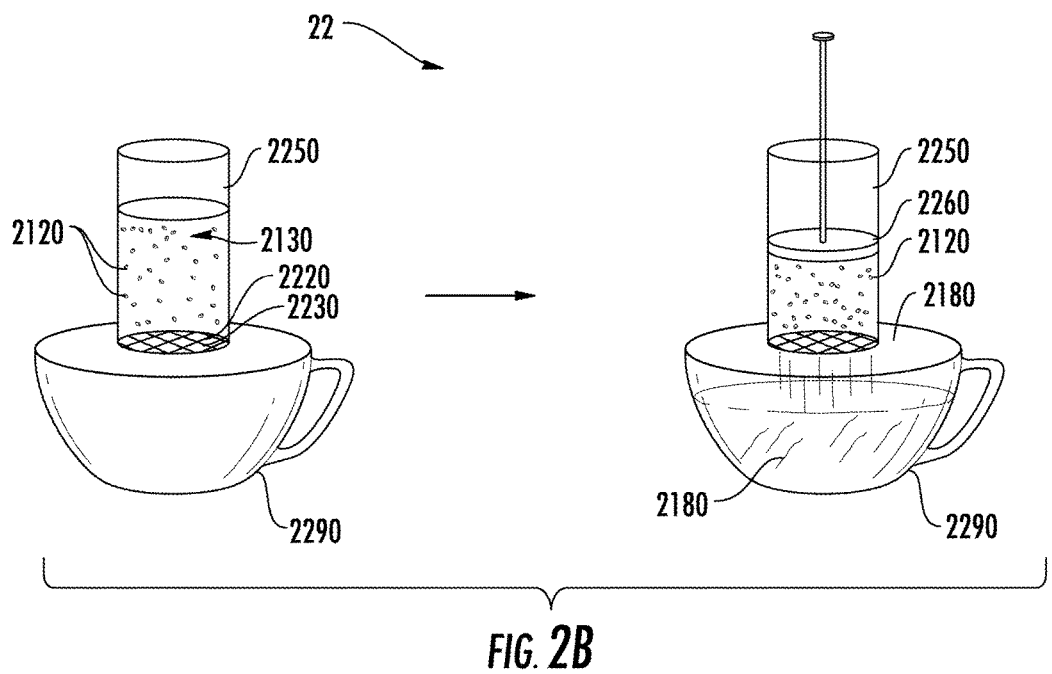
FIG. 2B illustrates an Aeropress® device.
Figure 2C:
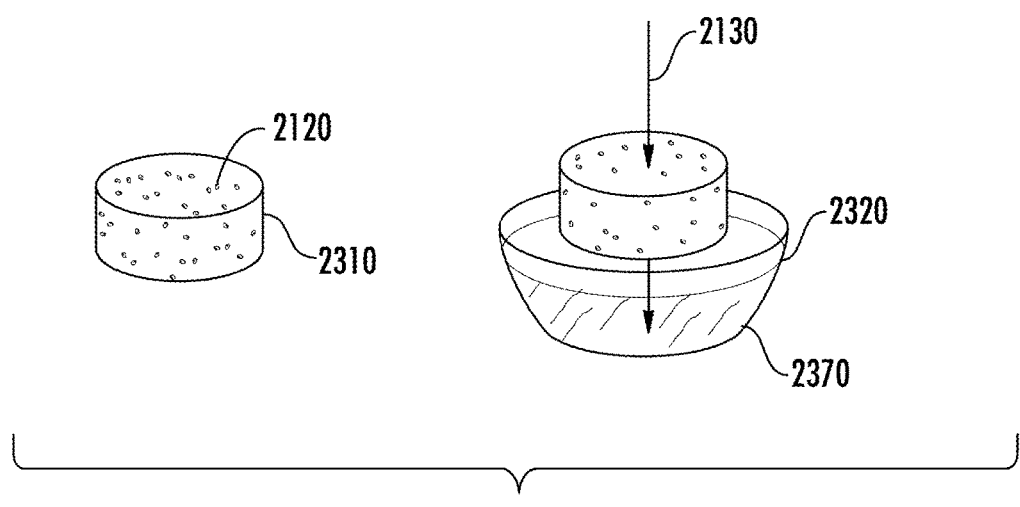
FIG. 2C illustrates the principles of making espresso.

Preparation of coffee drinks has remained largely an art in the sense that efficient and accurate reproduction of a desired flavor is extremely difficult. Generally, it requires a trained person (e.g., a barista) with a refined palate to taste a coffee drink and make another cup that has the same flavor, especially with a different batch of beans. While many people make and drink coffee drinks as part of their daily routine without much thought or complaint, even an average coffee drinker would admit that some coffee drinks taste better than others. The inventive concept disclosed herein allows a coffee drinker to reproduce the flavor of a model coffee drink in the convenience of his own home, without having to travel to a remote coffee shop or spending a lot of time. This reproducibility is achieved by characterizing a model coffee drink with a set of brew parameters and making those parameters available to people who make coffee.

In one aspect, a method for preparing a coffee drink having consistent taste characteristics includes characterizing a coffee drink with a set of brew parameters that are specific to batch of roasted coffee beans. As will be disclosed in more detail below, brew parameters include grind size, ratio of water to grounds, packing pressure (for espresso coffee drinks), water temperature, dwell time, extraction pressure, and agitation time, among others. A small portion of the roasted batch of beans may be used for the characterization to determine the brew parameters, with the assumption that the same characterization applies to the "batch" of beans that came from the same source (e.g., field) and were roasted together. The brew parameters may hence be used with portions of the batch that were not directly characterized.

In another aspect, brew parameters for a batch of coffee beans may be stored in a database and associated with an identifier assigned to the particular batch of coffee beans. A user can use the identifier to access the brew parameters that are stored. For example, the user may enter the identifier affixed to a bag of coffee into a website to retrieve the brew parameters. Alternatively, the user may use a portable device (e.g., a smartphone) to read the identifier that is encoded on the bag of beans and obtain brew parameters.

In some embodiments, the brew parameters are encoded directly onto a bag of beans so that a user can read the code to obtain the brew parameters. In other embodiments, a software would receive input from the user regarding the type of coffee maker he is using or the type of drink he wants to make (e.g., a cappuccino) and provide brew conditions that are obtained using the brew parameters. "Brew conditions" include parameters other than brew parameters that affect the brewing, such as settings for particular grinders in the market and recipes that may be used to make the desired drink. The "brew conditions" are determined based on the brew parameters that characterize the beans.

The specific taste characteristic of brewed coffee is the result of the total dissolved solids ("TDS") that dissolve from the ground roasted coffee beans into the water. Another component that affects a coffee drink's taste characteristic is the type and quantity of compounds extracted that manifest as TDS. For example, hotter water and longer steep times will tend to release more chlorogenic acid lactones and phenylindanes, while cooler water and shorter steep times will tend to release more acidic compounds. The taste is affected by the quantity of TDS compared to the amount of water (the "TDS ratio") and also the chemical composition of the TDS. The TDS ratio and chemical composition are influenced by the characteristics of the roasted coffee beans themselves and the process used for preparing coffee, i.e., the process used for extracting the TDS. The characteristics of the roasted coffee beans can be influenced by factors such as the growing conditions and roasting conditions that can be difficult to reproducibly control. However, for a given batch of roasted coffee beans, if the process for preparing the coffee which is an aqueous extraction process for the TDS—can be reproduced, the same taste characteristics for coffee resulting from the batch of roasted coffee beans can be reproduced.

Figure 3:
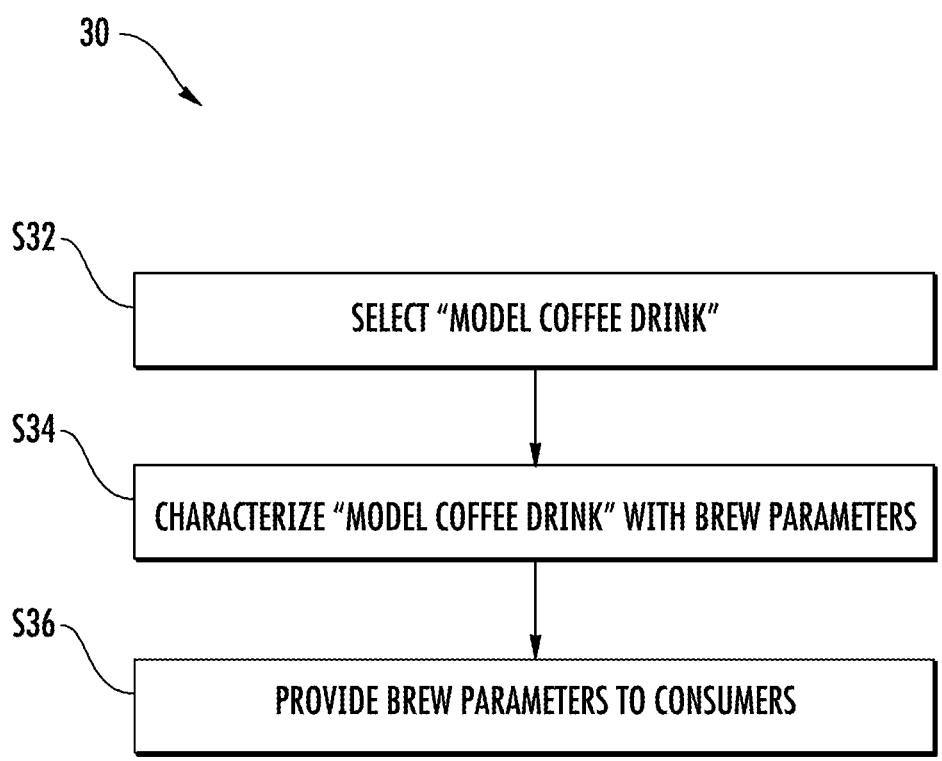
FIG. 3 is a flowchart depicting a brew parameter generation process in accordance with an embodiment of the inventive concept.

FIG. 3 depicts a brew parameter generation process 30 in accordance with an embodiment of the inventive concept. As shown, the brew parameter generation process 30 includes selection of a "model coffee drink" for a batch of beans (S32). The "model coffee drink" is the drink which has the flavor that consumers would want to replicate. During the model coffee drink selection process of S32, batches of coffee beans are subjected to tests and characterized to determine which of the various sets of parameters produces the "perfect" coffee flavor. This determination may involve a trained professional or a tasting panel that tastes coffee drinks made with different brew parameters and votes on or selects the best drink. Another way for making this determination is to allow the purchasers of the roasted coffee beans to submit brew parameters, and then to have members of the community vote for their favorite flavors, for example through a social network or an online voting software. Since the brew parameters used to produce each coffee drink is known, the brew parameters that were used to produce the drink that received the most number of votes can be easily identified. Yet another way to determine the brew parameters of a "good coffee drink" involves chemical analysis. This process may take the form of analyzing for a few ingredients in the coffee, for instance by determining caffeine level, acrylamide level, pH, or the content of any specific chemical identified as contributing positively or negatively to the desired result. Testing by chemical analysis may also take the form of determining overall results, such as the total amount of TDS, or a spectrographic result of the TDS and comparing to known amounts/spectrographs for coffee with desirable properties. The inventive concept is not limited to any particular way of selecting the "model coffee drink."

Once the "model coffee drink" is selected, its properties are translated to brew parameters (S34) that will allow consumers to replicate its flavor. The aqueous extraction process for extracting the TDS from roasted coffee beans into a coffee drink is controlled by a set of brew parameters, which include the following:

1) The particle size distribution of the ground coffee beans, referred to herein as "grind."
2) The ratio of the amount of water to the amount of ground coffee beans, referred to herein as "ratio."
3) The temperature of the water, referred to herein as "temperature."
4) The amount of time the slurry (the mixture of the water and the coffee grounds) is agitated or mixed, referred to herein as "agitation."
5) The amount of time the slurry is allowed to steep, referred to herein as the "dwell."
6) For brewing methods that require pressure (such as espresso and Aeropress) the extraction pressure, referred to herein as "pressure."
7) For espresso, or other brewing methods where the grounds are first packed, the packing pressure, referred to herein as "pack."

The brew parameters listed above are not intended to be exhaustive, and the inventive concept disclosed herein is not limited to any particular combination of brew parameters. For example, in some embodiments, the following parameters may be included in the brew parameters:

1) The total extraction time, which is the time required to separate the liquid from the ground coffee beans (after any dwell and/or agitation), referred to herein as "extraction time"
2) The volume of the extracted liquid, referred to herein as "volume"

Each brewing method requires managing the set of parameters that are relevant to the particular device. For example, for espresso extractions, the primary parameters necessary to control are the grind, pack ratio, temperature, dwell and pressure. These brew parameters result in the extraction time and volume, and the resulting quantity and chemical composition of the TDS. This relationship can be expressed as the following relationship (1):

$$\{grind, pack, ratio, temp, dwell, pressure\} \blacktriangleright \{extraction\ time, volume\} = infusion\ compound \quad (1).$$

For an AeroPress® extraction, the primary parameters necessary to control are the grind, ratio, temperature, agitation, dwell, and pressure. These primary parameters result in the extraction time, and the resulting quantity and chemical composition of the TDS. With an Aeropress® as compared to espresso, there is no "puck" so the pack is not relevant. However, the agitation time is important. For an Aeropress®, the relationship can be expressed as follows:

$$\{grind, ratio, temp, agitation, dwell, pressure\} \blacktriangleright \{extraction\ time\} = infusion\ compound \quad (2).$$

For a French press, the primary variables are grind, ratio, temperature, agitation and dwell. With a French press no pressure is applied and also there is no "puck," so no pack pressure is required, and the relationship can be expressed as follows:

$$\{grind, ratio, temp, agitation, dwell\} = infusion\ compound \quad (3).$$

Traditionally, coffee brewers have treated the brew variables as an informally managed group. This is largely because the grind, i.e. particle size distribution of the ground roasted coffee beans, has been impractical to measure, and thus needed to be determined via trial and error and validated each time by tasting the result. At the same time, the grind has a high impact on the resulting taste characteristics of the coffee. Thus, of all the variable parameters in the brewing process, the ability to accurately measure and control the grind has a great effect on the quality of the coffee.

With the ability to measure grind accurately, it becomes possible to treat grind as the main primary parameter, and fix the remainder of the primary parameters based on the grind to produce predictable results in the secondary group and consequently create consistent characteristics from the extraction. A novel method for determining particle size distribution for ground roasted coffee beans is described below with respect to FIGS. 8A, 8B and 9. In the method, an ordinary camera, such as a camera attached as part of a smart phone, is used to photograph (or generate a bitmap of) a small amount of coffee grounds distributed on a calibration grid. The photograph (bitmap) is then processed to determine the particle size distribution of the grounds. This method is practical to implement, and thus grind can be reproduced, making reproducible taste characteristics of the coffee possible.

An example of encoded brew parameters may look like the following:

Batch ID: 875QQT-CR
Method: AeroPress
Coffee Weight: 35 g
Water Weight: 200 g
Water Temp.: 175f
Grind: 80% @203 μm, SD<1.4
Pre-Infusion Time: 4 sec
Agitation Time: 10 sec
Dwell Time: 5 sec
Extraction Time: 20 sec Extraction Volume: 185 g These brew parameters, which are for use with an Aeropress® device, includes the settings a user can use to produce a coffee drink that tastes like the "model flavor" that was selected by the model determination process described above. In this particular example, the grind brew parameter indicates that to reproduce the selected flavor, 80% of the grind particles have a size of 203 μm or less (within a standard deviation of 1.4).

The brew parameters affect each other, such that when one parameter changes, one or more of the other parameters may be adjusted to "work with" the change and obtain the same result. For example, if the grind is too coarse, the water temperature and/or dwell time can be adjusted (e.g., increased) to compensate for the coarseness and achieve the same desired flavor. Similarly, if the grind is too fine, the water temperature and dwell time can be adjusted (e.g., decreased) accordingly to compensate for it.

Once the brew parameters are determined in S34, the brew parameters are made available to consumers (S36). In one embodiment, the brew parameters are encoded and associated with the batch of beans. For example, where the beans are packaged into one-pound bags, the brew parameters may be encoded and affixed to the packaging. In one embodiment, the brew parameters for different types of coffee makers may be printed on a sheet of paper or sticker and affixed to a bag of coffee beans. A user who purchases the coffee beans would automatically receive the brew parameters for reproducing the "model coffee drink" using those beans.

In another embodiment, the brew parameters are encoded and affixed or printed onto the packaging of the coffee beans. A user would scan the code using a scanner or a code reader (which may be implemented as an application for a smartphone) to obtain the encoded brew parameters. The parameters could also be encoded on an RFID or NFC device.

In one embodiment, the selection of the model coffee flavor (S32) is done for a number of cateuories, such as "strong and robust," "medium body," and "light and smooth," with a model coffee drink (and its brew parameters) selected for each category.

In yet another embodiment, the brew parameters are stored in a database and accessed by the users. Each batch of beans that is characterized is assigned an identifier. For each coffee bean batch identifier, brew parameters for different types of coffee makers (e.g., French press, Aeropress®, espresso) are entered for the different flavor categories into a database. The brew parameter database may include other data, such as a list of commonly used coffee makers and any brew parameter adjustments to be used with each of the different-brands and models. Also, if professional tasters were used to determine the "model coffee drink," instead of agreeing on one set of best brew parameters, the parameters most liked by each professional taster could be stored separately and identified. This way, with experience, someone making the coffee would know which taster's selection he usually prefers and choose the brew parameters associated with that taster's model drink. Additionally, the database may include dates and timetables so that, if the brew parameters change over time, for instance as the roasted beans become less fresh, corrected brew parameters can be accessed.

In addition to the brew parameters associated with each brew condition, a related table of settings, for instance for particular devices, may be stored (e.g., in a look-up table).

Additionally, the identifier may be linked to other information related to the batch of roasted coffee beans, such as, for example, varietal, origin, batch and roast dates, additional descriptive content (i.e. color and size of beans), "use by" dates, additional recommendation regarding the roasted coffee beans, suggested brew methods and these information may be stored or linked to the brew parameter database. The database can be updated as needed.

Figure 4:
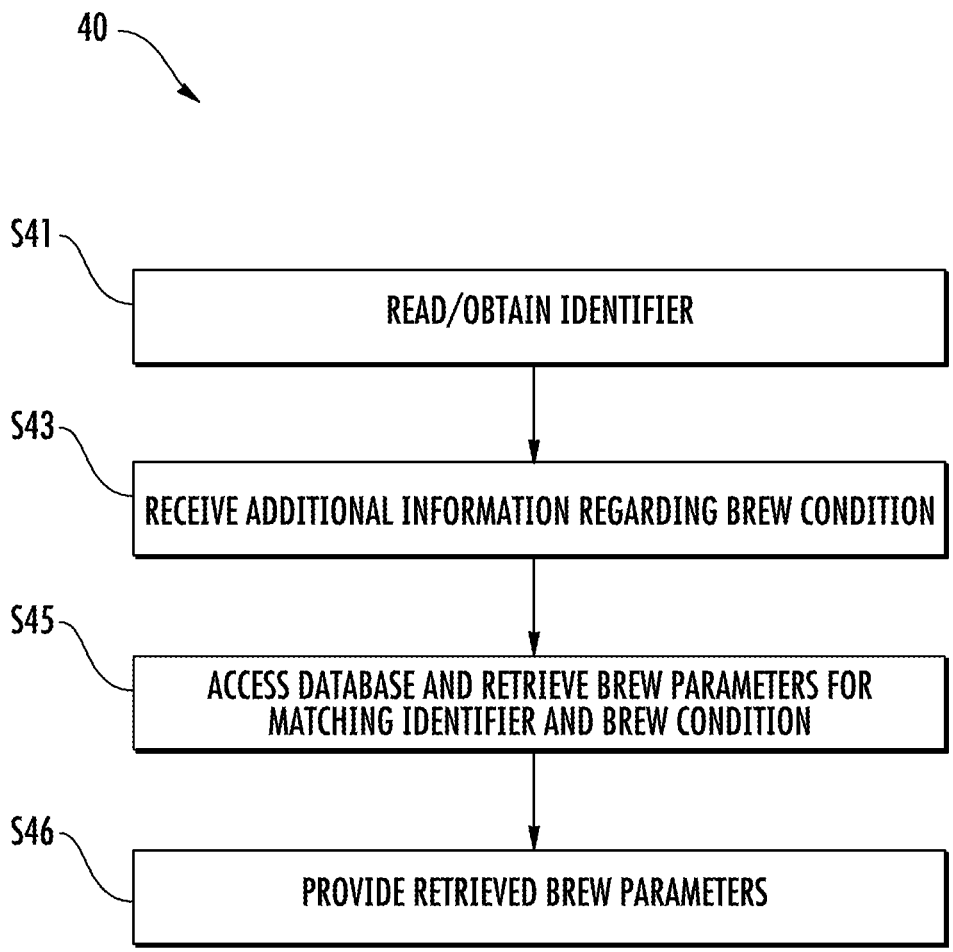
FIG. 4 is a flowchart depicting parameter-based coffee replication process in accordance with an embodiment of the inventive concept.

FIG. 4 depicts an embodiment of a parameter-based coffee replication process 40 in accordance with the inventive concept. In this process 40, the coffee bean identifier is obtained (S41). The identifier can be input by the user or read by the machine, depending on the encoding method used. For instance, a barcode, QR code (Quick Response Code), RFID Tag (Radio Frequency Identification), or URI (Uniform Resource Identifier) code identifier could be read by a scanner, or a code number printed on the coffee bean package could be manually input into a web-based application. In addition to the identifier, other information that will narrow down the set of parameters in the database may be requested and received (S43). This additional information may pertain to the type of grinder and/or coffee maker that is being used (e.g., Aeropress®, standard drip, French press, espresso) and/or the desired flavor category (strong, medium, light). Using the identifier and the optional additional information, the correct set of brew parameters are found in the database (S45). The database may be accessed via a network or stored locally. Upon retrieving the set of brew parameters for reproducing the flavor of the model coffee drink using the consumer's coffee maker, the brew parameters are retrieved and provided, for example to the user (S46). The brew parameters may be provided to the user as an easy-to-follow, step-by-step instruction.

The parameter-based coffee replication process 40 may be implemented as a software or firmware residing in different machines. For example, the software may be implemented as an application for a smartphone that can be downloaded. The software may also be implemented as a web-based application in which the user interacts with a web-based interface. The software may also be implemented, in total or partially, as part of an automatic coffee grinding and/or brewing device, and used to run the device as described below.

Figure 5A:
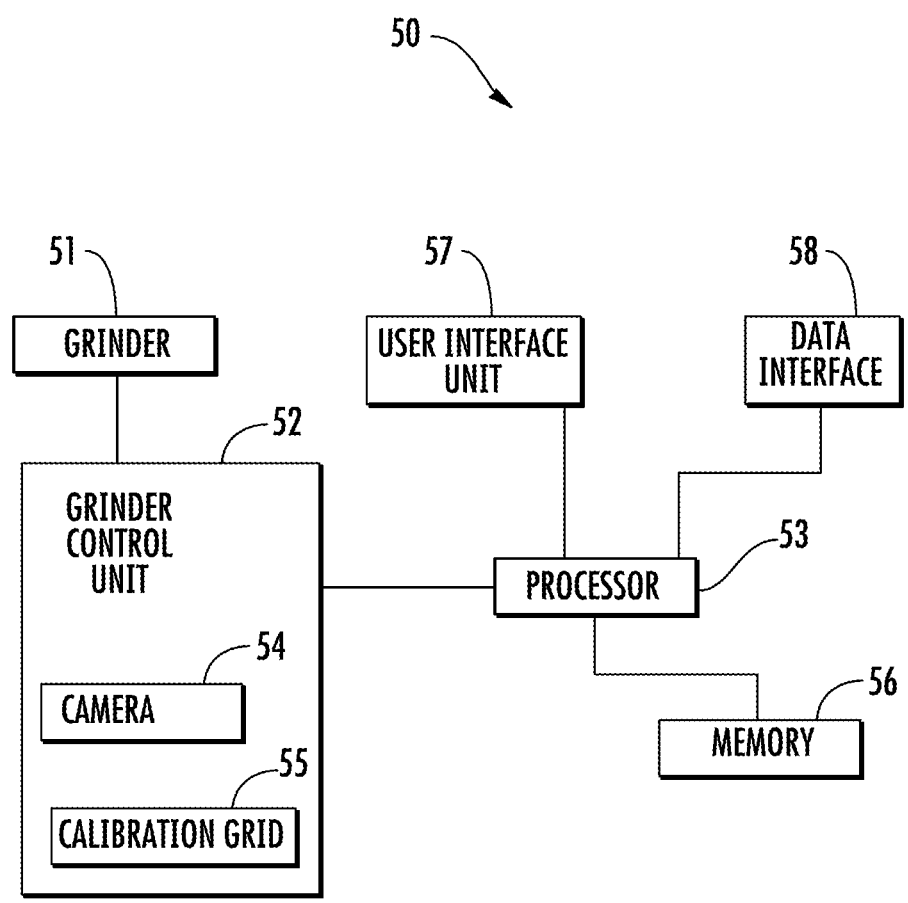
FIG. 5A is a schematic diagram of a smart coffee grinder that is configured to carry out a parameter-based grinding process depicted in FIG. 5B, in accordance with an embodiment of the inventive concept.
Figure 5B:
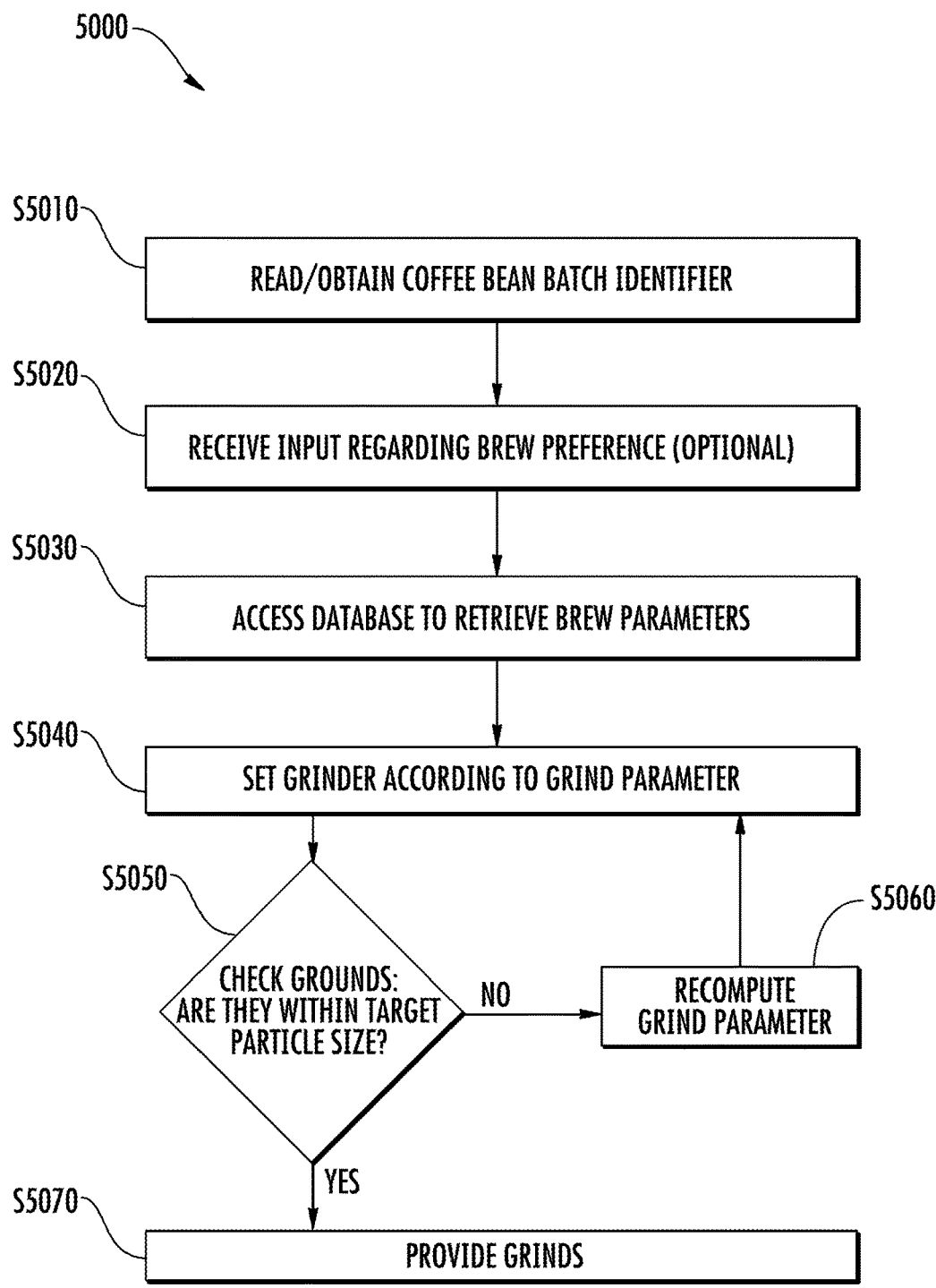
FIG. 5B is a flowchart depicting the parameter-based grinding process in accordance with an embodiment of the inventive concept.

FIG. 5A depicts an embodiment of the inventive concept that includes a "smart" coffee grinder 50 that is configured to carry out a parameter-based grinding process 5000 that is depicted in FIG. 5B. The smart coffee grinder 50 is configured to receive a user request about the type of coffee drink that is desired, retrieve the brew parameters (specifically, the grind parameter), and produce coffee grinds that meet the brew parameter requirement. As shown, the smart coffee grinder 50 includes a grinder 51 for grinding the beans, a grind control unit 52 for controlling the particle size of the coffee grind, and a processor 53. The smart coffee grinder 50 is also able to communicate with a consumer via a interface unit 57. The user interface unit 57 may be built into the smart coffee grinder 50 or be in communication with (via hard wire or wirelessly) a separate user interface unit (e.g., smartphone, tablet, laptop, desktop, PDA). The user interface device is able to receive user input as well as output information to a user and typically includes a visual and/or audio devices. The smart coffee grinder 50 also has a data interface 58 through which it accesses the brew parameter database. The data interface 58 may be a port configured to receive a memory device that stores the brew parameters, or a network connectivity port that allows database access via a network.

In one embodiment, the grind control unit 52 may be implemented using the particle size determination method that is described below with respect to FIGS. 8A, 8B and 9. Where the method that is described below is used, the grind control unit 52 includes a camera 54 positioned over a calibration grid 55 that has calibration marks. The processor 53 obtains the brew parameters for the user's desired coffee drink in the manner shown in FIG. 3, for example from the database mentioned above. The processor 53 extracts the grind size parameter from the brew parameters, and adjusts the setting and grind time of the grinder 51 to achieve the prescribed grind size. The processor 53 may be programmed to translate the brew parameters to certain settings for the grinder 51. After the initial grind, a sample of the coffee ground is sprinkled on the calibration grid 55 and imaged with the camera 54. Distortion corrections may be made in accordance with the method of Appendix A and the particle size distribution of the grind is determined. If the particle size distribution is within the grind size parameter of the brew parameters for the desired drink, the grinding is complete. If, on the other hand, more grinding is needed, the grinder 51 is turned back on at an adjusted setting that is likely to get the grind to the correct particle size. A sample of the re-ground coffee grinds is then sprinkled on the calibration grid 55, the particle size distribution is determined again, and the iterative grinding cycle continues until the desired particle size is reached.

The smart coffee grinder 50 may be equipped with a local memory 56 that stores the coffee bean identifier and the grind settings associated with that identifier. Hence, if a user wants to make the same type of coffee drink for several days using the same bag of coffee, the smart coffee grinder 50 would not have to repeat the entire process of FIG. 3 each time.

FIG. 5B depicts the parameter-based grinding process 5000 that may be executed by the smart coffee grinder 50 in accordance with the inventive concept. The smart coffee grinder 50 reads the coffee bean identifier (S5010), optionally receives input from the consumer regarding brew preferences and conditions (e.g., the desired flavor category) (S5020), and retrieves the correct set of brew parameters from the database (S5030). It identifies the grind parameter from the brew parameters, and sets the grinder 51 to a setting and runtime that would achieve the desired particle size of the grind (S5040). After the grinding process is complete, the grind control unit 52 checks the grounds (S5050) to see if the particle size is within the target range defined by the brew parameters. Initially, the smart coffee grinder 50 may set the grinder to produce grounds that are slightly coarser than what is ultimately desired, so that the second round of grinding can recompute the grind parameter to fine tune the grounds (S5060) and obtain grinds that are within target particle size. Once the target particle size is reached, the grounds are provided to the user (S5070).

Figure 6A:
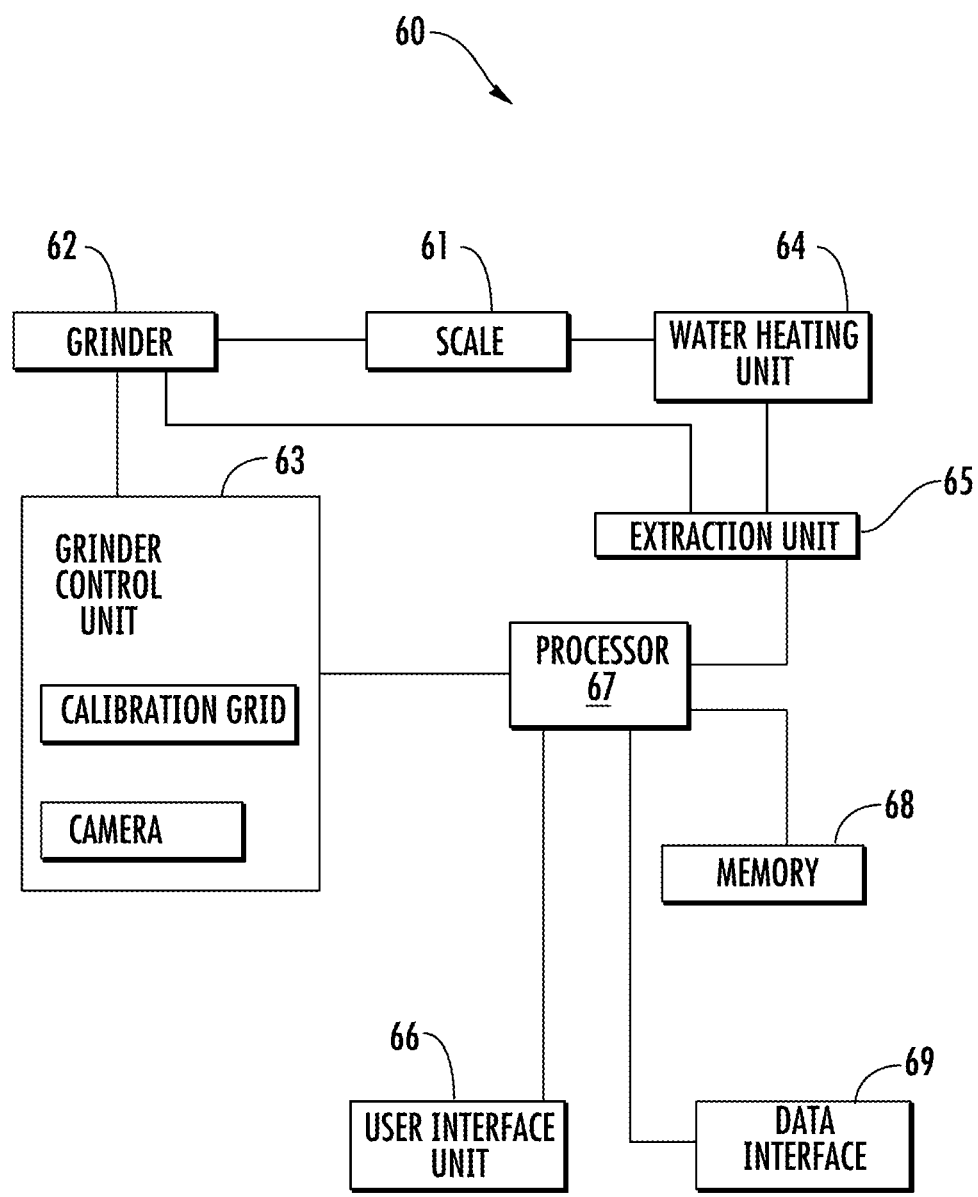
FIG. 6A is a schematic diagram of a smart coffee maker that is configured to carry out a parameter-based coffee preparation process depicted in FIG. 6B, in accordance with an embodiment of the inventive concept.
Figure 6B:
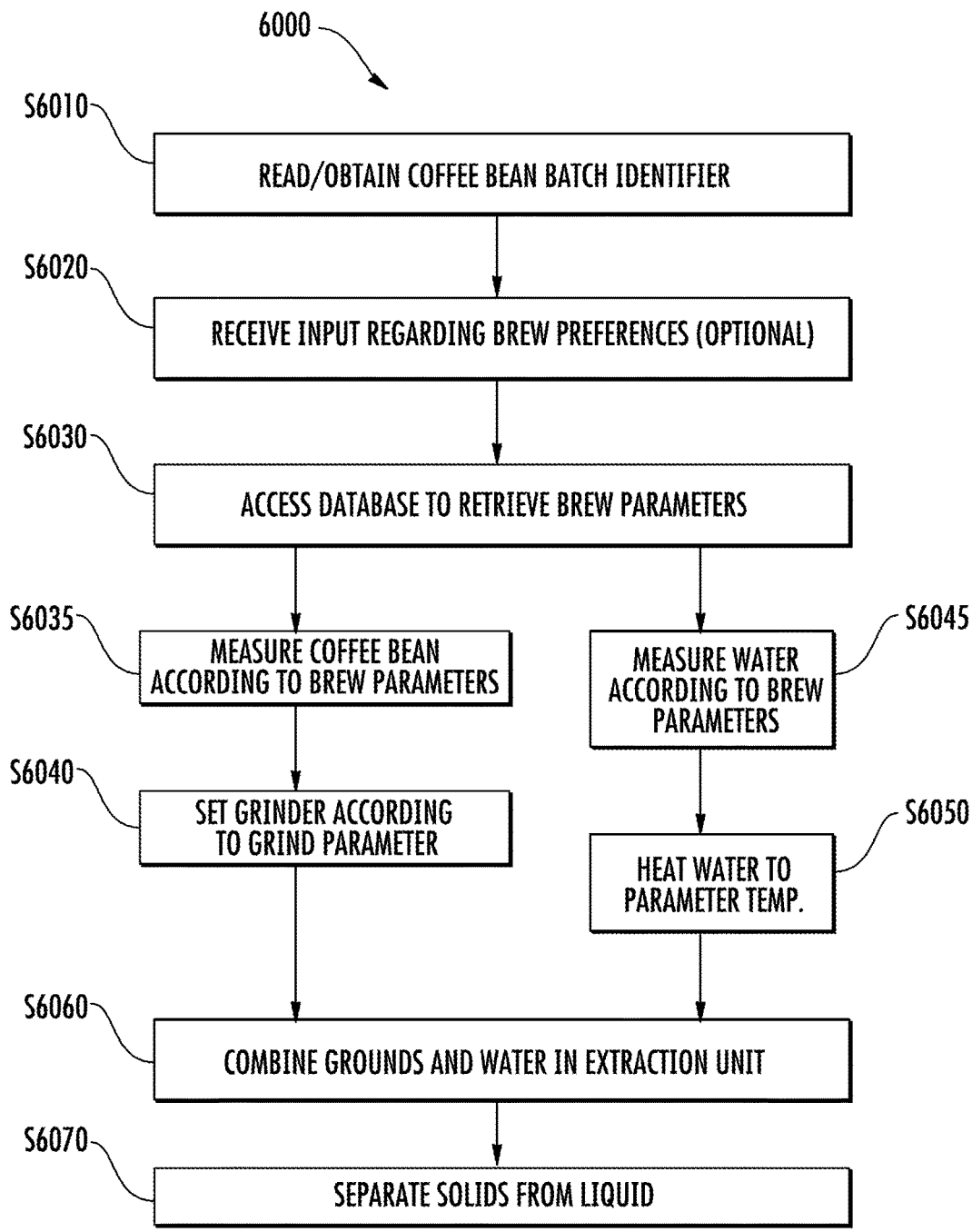
FIG. 6B is a flowchart depicting the parameter-based coffee preparation process in accordance with an embodiment of the inventive concept.

FIG. 6A depicts an embodiment of the inventive concept that includes a "smart" coffee maker 60 that is configured to carry out a parameter-based coffee making process 6000 that is depicted in FIG. 6B. In some embodiments, the smart coffee maker 60 may incorporate the smart coffee grinder 50. Specifically, the smart coffee maker 60 includes a scale 61 for weighing the coffee beans and/or water, a grinder 62 for grinding the coffee beans, a grind size control unit 63 for determining the grind size, a water receiving and heating unit 64, an extraction unit 65 where the grind and the water are placed in contact, and a coffee drink receiving unit 66. Where the brew parameters specify the water amount in terms of volume, the water receiving unit 64 may have marks that indicate water volume. The smart coffee maker 60 includes a processor 67 coupled to a local memory 68 and a data interface 69 that may be configured with network connection capability. The network connection capability is useful for accessing the database described above.

FIG. 6B illustrates the parameter-based automated coffee making process 6000 that may be executed by the smart coffee maker 60 in accordance with an embodiment of the inventive concept. The smart coffee maker 60 reads the coffee bean identifier (S6010), optionally receives input from the consumer regarding brew preferences such as the desired flavor category (S6020), and retrieves the correct set of brew parameters from the database (S6030). It identifies the grind parameter from the brew parameters, obtains the correct amount (weight) of coffee beans (S6035), places the coffee beans in the grinder 62 set to a setting and runtime that would achieve the desired particle size of the grind (S6040). After the grinding process is complete, the grind control unit 63 checks the grounds to see if the particle size is within the target range defined by the brew parameters, as described in reference to FIG. 5B, for example using the technique described below with respect to FIGS. 8A, 8B and 9. Once the desired particle size is achieved, the grounds are poured into the extraction unit 65 (S6060). Water is measured, e.g. with the scale 61, to obtain the amount prescribed by the brew parameters (S6045) and heated to the prescribed temperature (S6050). The water and the grounds are combined (S6060) in the extraction unit 65 and placed in contact (with agitation, in some devices) for the amount of dwell time prescribed by the brew parameters. The grounds are separated from the liquid portion of the coffee drink (S6070) to produce the coffee drink.

Once the coffee is brewed, the software can, optionally, request and incorporate feedback regarding the coffee (not shown). This feedback may be, for example, a chemical analysis of either specific chemicals or of the resulting coffee in total, to compare to results of a chemical analysis described above, such as to provide a cross-check on the resulting coffee. This feedback may also be, for example, provided by the users. For example, as the community gains experience with a roast batch they may provide variations on the brew parameters to achieve different results. These updates can be published and rated by other members of the community.

Figure 7:
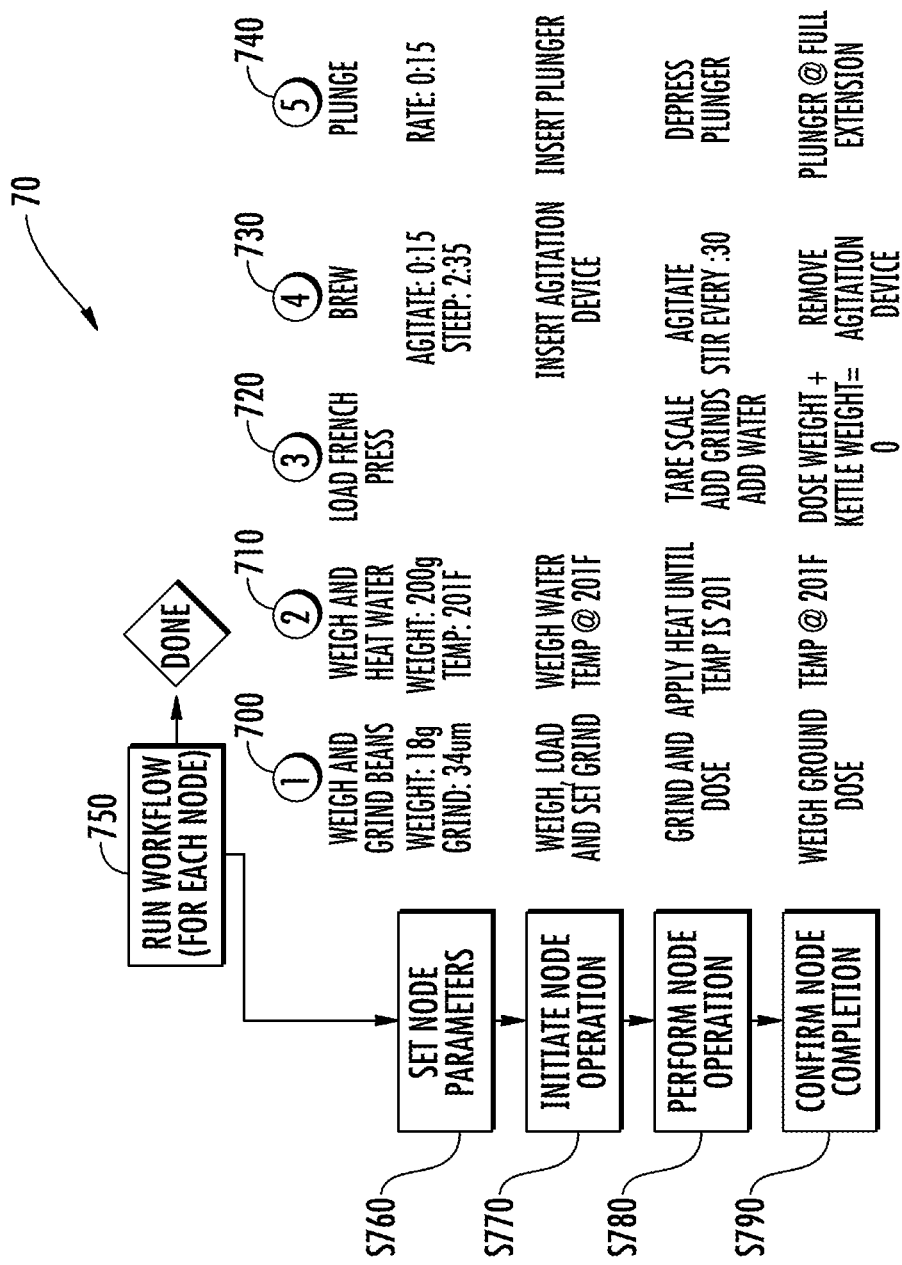
FIG. 7 is an example of a parameter-based automated coffee preparation process.

FIG. 7 illustrates an example operation of a parameter-based automated coffee preparation process 70 in accordance with the inventive concept. The particular example is for use with a French Press device, although the process can be adapted for any type of device. In this automated coffee preparation process 70, there are five nodes: node 1 (700) for weighing and grinding beans, node 2 (710) for weighing and heating water, node 3 (720) for loading the extraction unit, node 4 (730) for extraction, and node 5 (740) for plunge control. Each node is controlled by a control unit 750. The nodes may be different parts of an integrated unit such as the smart coffee maker 60 described above, or separate units that can communicate with the control unit 750, for example wirelessly (e.g., via Bluetooth). For example, node 1 may be at a grinder, node 2 may be at a kettle, and nodes 3, 4, and 5 may be at a free-standing French Press device.

The control unit 750 controls the nodes independently in a coordinated manner. The control unit 750 has access to the brew parameter database, and retrieves the parameters for each node from the database. It then sets the node parameters according to the retrieved parameters (S760) and initiates the node operation (S770). The node operations are then performed (S780) in a coordinated manner, such that the steps of the process happen in the right order. With each step, the control unit 750 confirms that the operation has been completed before moving on to the next step (S790). There is a timer built into or read by the control unit 750 so that the control unit 750 can set the runtimes for various processes (e.g., grinding, agitating) according to the brew parameters.

Figure 8A:
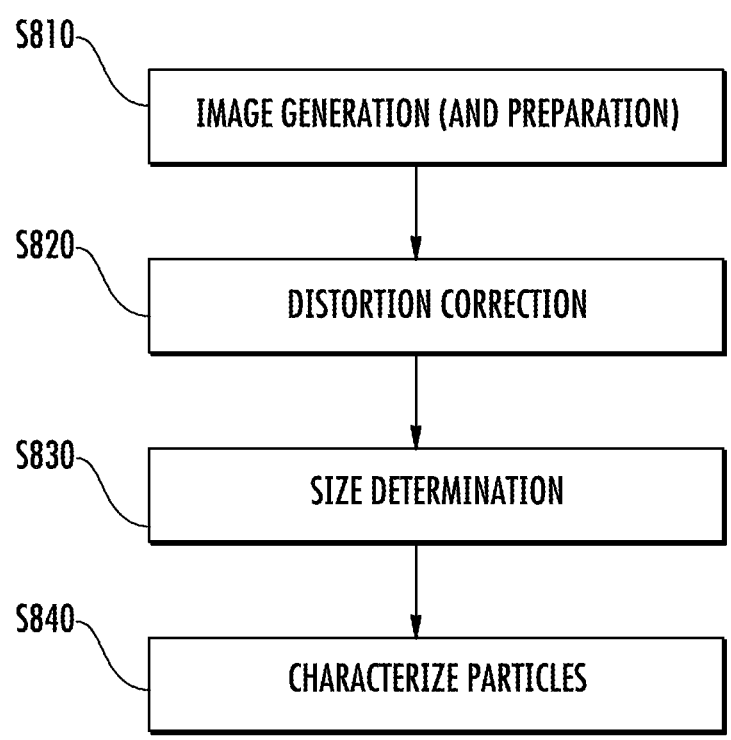
FIG. 8A is a flow diagram of an embodiment of a particle size determination method.
Figure 8B:
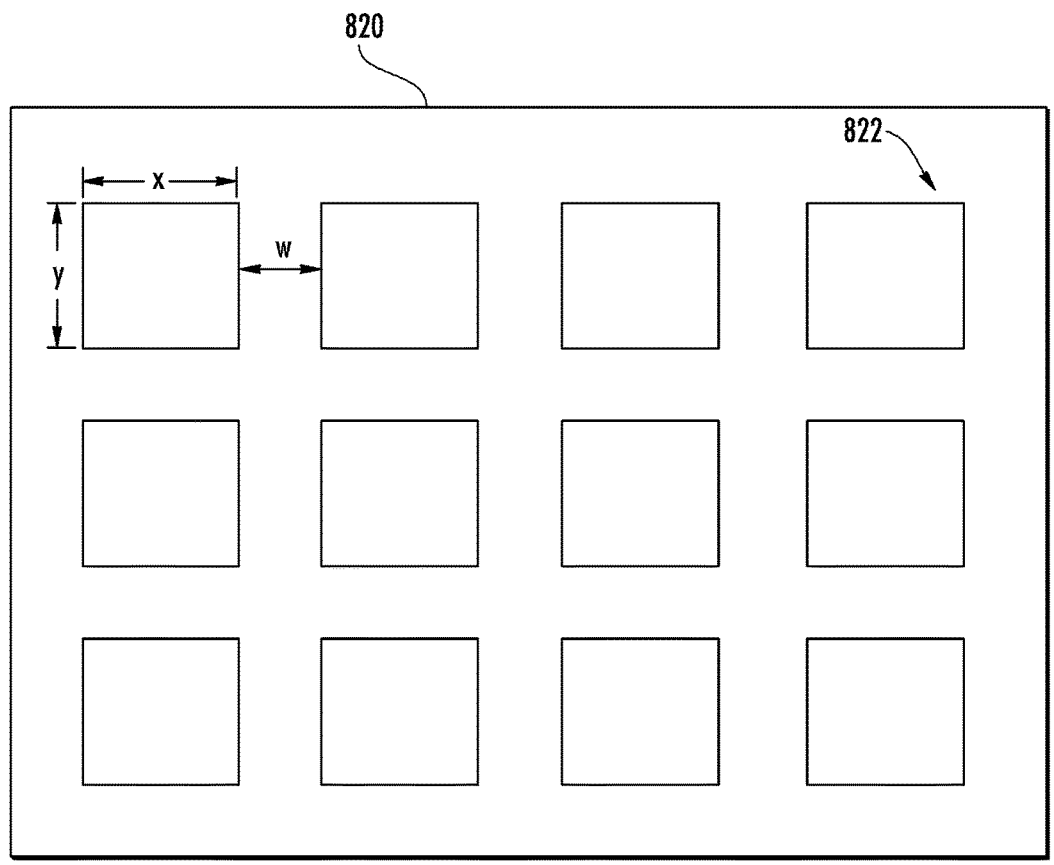
FIG. 8B illustrates an example of a calibration pattern.
Figure 9:
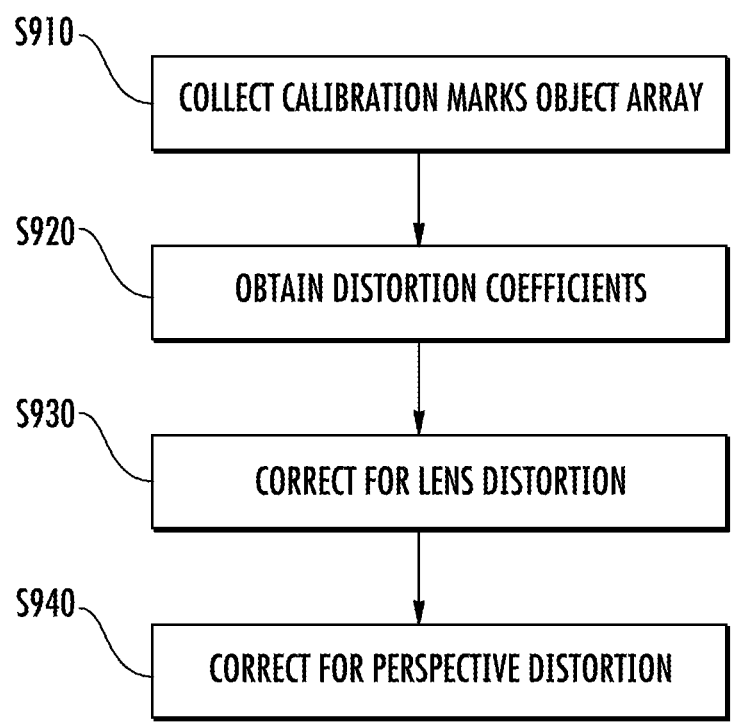
FIG. 9 is a flow diagram of a method for correcting lens and perspective distortions in an image.

The method of determining the particle size distribution of ground coffee beans using an image is described with respect to FIGS. 8A, 8B and 9.

The method entails generating or otherwise obtaining an image (e.g., a bitmap) that includes the small particles of the ground coffee beans and a calibration pattern, wherein the dimensions of the calibration pattern are known. The image may be produced, for example, using any conventional camera to image the small particles positioned on or around a calibration pattern. Where particle size is small (e.g., in the order of $10^{-6}$ inches), corrections are made to account for distortions caused by the camera lens.

In one embodiment of the method that is disclosed, the particle size of the ground coffee beans is determined using a calibration pattern that includes marks of known dimensions. The calibration pattern and the particles are imaged together, with the assumption that the same distortions will apply to both the calibration pattern and the particles. Using the known dimensions of the calibration pattern, a transformation is generated for removing the distortion effects and converting the image to a corrected image that is free of distortion effects. The transformation is then applied to determine particle size distribution from the corrected image.

Advantageously, any camera (or other device capable of producing a bitmap) can be used to record the bitmap, and specialized imaging or recording equipment is not required. Furthermore, because the calibration pattern and particles are recorded together in a single image, the camera, lens and other image parameters do not need to be known to correct for distortions and extract accurate particle sizes. Capturing the particles and the calibration pattern together in one image eliminates the need to record additional, separate calibration images to obtain a set of parameters to correct for distortions before recording the measurement image. In the method that is disclosed, the information necessary to accurately determine the sizes of the ground coffee beans is embedded in a single image.

FIG. 8A illustrates an embodiment of a method for determining particle size. After the particles to be measured are distributed on a calibration pattern, for example calibration grid 55 (FIG. 5A), the camera 54 is used to capture a digital image (e.g. record a bitmap) of the particles on the calibration grid 55 (step S810). The image generation may include preparation of the image to facilitate object recognition, for example by applying image processing techniques (including, but not limited to noise reduction and/or thresholding and/or filtering) to improve the clarity/definition of the image. Any suitable noise reduction techniques may be used.

Any technology for capturing or generating two-dimensional or three-dimensional images may be used in step S810, including techniques that utilize photographic (i.e., visible light), ultrasound, x-ray, or radar. The inventive concept is not limited to any particular way of capturing the bitmap. The calibration pattern, such as calibration grid 54, usefully includes a background and calibration marks. For example, the calibration marks of calibration grid 54 are the outlines of squares having consistent dimensions x and y, which are drawn with lines of a substantially constant thickness and repeated at a consistent interval w in rows and columns. For example, FIG. 8B shows a calibration grid 820 with calibration marks 822 that are the outlines of squares having consistent dimensions x and y, which are drawn with lines of a substantially constant thickness and repeated at a consistent interval w in rows and columns. The dimensions of the calibration marks are known (e.g., by measuring the physical pattern). The calibration marks can be of any dimensions that provide enough information for producing a corrected image that allows accurate measurement in the desired particle size range.

The calibration pattern, for example calibration grid 54, is most useful if the main color or shade of the background has a high contrast to the color of the particles to be measured and the color of the calibration marks. It is also useful to have the color of the calibration marks be different than the color of the particles whose size is to be determined. For example, if the particles are brown or black, the background may be white and the calibration patterns may have a blue hue. In general, any material may be used for the calibration pattern, and it may be useful if the surface of the calibration pattern is impervious to the material of the particles, so that the particles do not damage the calibration pattern. In one example, the calibration pattern is a pattern printed on a sheet of paper and the particles of the ground coffee beans are sprinkled on it. A digital image of the calibration pattern may be obtained by the user and printed at home.

The smallest particle size of the coffee grounds that can be determined using the technique disclosed herein depends on a number of factors, one of which is the ratio between the smallest measurable object's pixel coverage and the calibration mark's pixel coverage. There also should be enough camera resolution to capture one or more calibration marks and enough particles of the sample to gather statistics. The camera that is part of an iPhone that is currently available in the market would allow determination of particle size as small as $1 \times 10^{-6}$ inches. In one embodiment, the dimensions of the calibration marks depend on the digital resolution of the camera and the size of the smallest particle to be measured. For example, for a camera having a resolution of 3264×2448 pixels, a square of 2 pixels by 2 pixels is needed to measure a particle with a diameter of $25 \times 10^{-6}$ inches, and a calibration pattern that is 400 pixels per side (i.e., surrounds an area of 160,000 pixels) is used.

Patterns may include repeating squares of a grid, and also patterns other than the repeating squares may be used for the calibration patterns. However, using a regular pattern that is mathematically easy to model, e.g., that includes orthogonal lines, for the calibration patterns may simplify the processing of the recorded image. Additionally, the calibrations mark uses maximum use of the color that has a high contrast to the color of the particles whose size is being determined. A pattern such as a "checkerboard" pattern, for example, may not work as efficiently because half of the boxes would be dark and, where the particles are dark, too many of the particles would lie on the dark areas where there is not much contrast between the particles and the surface they are on.

At step S820, the image of calibration grid 55 is corrected to remove distortions. One of the problems of using imaging for determining particle size is that various distortions in the recorded image will lead to inaccuracies in the size determination. These distortions are particularly deleterious when trying to make accurate measurements of small particles, in the size ranges of, for example, $10^{-6}$ inches. Such distortions can be the result of imperfections in lens geometry or alignment, which may cause, for example, straight lines to be captured in the image as non-straight lines. Distortion can also be the result of perspective distortion, which occurs when the camera's optical axis is not perpendicular to the center of the object being imaged, causing parallel lines to appear non-parallel in the image. As particle sizes are determined using the dimensions of the calibration marks, distortion in the image of the calibration marks will likely result in error in size determination. Hence, distortions in the calibration marks are corrected before particle size determination is done. At the end of step S820, a "corrected image" is produced that includes the distortion-free calibration marks and the original (uncorrected) image of the particles.

In one approach to removing distortions in step S820, calibration marks are extracted from the image. A domain filtering technique may be used for this extraction. For example, where the calibration marks are blue, a technique that uses a chroma range to extract patterns in the blue hue range may be used (the background of the calibration pattern is a different color from the marks). The result is a calibration mark object array that is built by extracting contours from the blue portions of the image. The calibration mark object array is used to generate a uniform scale that is useful for mapping the image, as in orthophotographs. This generation of a uniform scale is an ortho-transformation, which may be reused with the same calibration pattern repeatedly once it is generated.

At step S830, particle sizes of ground coffee beans are determined using the corrected image of the calibration pattern. This process entails extracting the particles from the corrected image using domain filtering. For example, domain filtering may be accomplished using a chroma range to extract the particles that are known to be in the brown/black color range. A particle object array is generated by extracting contours of the particles from the processed image. Each element of the particle object array can then be measured to determine particles dimensions, for example the extent (diameter), area and circularity of each particle. From these measurements, a size distribution of the measured particles is obtained. In measuring the particle sizes, the calibration pattern acts as a dimensional reference.

As mentioned above, the dimensions of the calibration marks in the physical world (as opposed to in the image) are known. Optionally, the accuracy of the calibration mark distortion correction used in S820 can be cross-checked by measuring the calibration marks in the corrected image and calculating the discrepancy from known sizes of the calibration marks in the calibration pattern.

As step S840, the measurements of the particle object array are characterized. A size distribution histogram, an area distribution histogram, volume distribution histogram, minimum, maximum and standard deviations and distribution peak analysis may be used to determine a set of size parameters that characterize the size and shape of the particles of the ground coffee beans. A "set" of size parameters, as used herein, is intended to mean at least one size parameter.

In some cases, the particle size determination may be made with the objective of processing (e.g., grinding) the particles to achieve a desired size. In these cases, there may be a profile of target particles that is available, and the profile may be defined in terms of the set of size parameters that is used in step S840. Based on a comparison of the measured parameters (result of step S840) against the profile of the target particles, one may determine what action needs to be taken to bring the two profiles closer. This determination may be made automatically by a processor or by a person. Where the determination is made automatically, the processor may indicate to an operator (e.g., visually and/or by sound) that further grinding would bring the measurement closer to the target profile.

When brewing coffee as shown in FIGS. 5 and 6, a user who desires to make coffee of a certain flavor may obtain the profile of target coffee grinds, i.e., the grind size, that he knows would produce the flavor he wants when used with a specific setting in his coffee maker. Such user could sprinkle some coffee grinds on the calibration 54 and use the above method to obtain the set of size parameters that characterize his grinds, then compare the size parameters to the target profile. For example, if the set of parameters indicate that measurement distribution for his grinds is centered on 0.035 inch and the target profile is for 0.0475 inch, the user would know that he ground the beans too fine and that he needs to restart with a coarser preparation.

Now, further details will be provided about the distortion correction step S820 of FIG. 8A, and particularly about the generation of a transformation matrix for converting the original, distorted image to a distortion-free corrected image. The actual position of the calibration patterns is known from the physical, real-world calibration pattern. So, a comparison of the two (i.e., the actual position and the position in the image) can be used to determine a transformation matrix (or any other scalar) that converts the imaged calibration pattern back to the actual calibration pattern. This transformation matrix for the calibration pattern shows how to convert the image to real world measurements, and vice versa. The transformation matrix may be extrapolated across the set of pixels and applied to either the whole image or to a selected portion of the image in which, again using a chroma range extraction, just the particles are shown (obtained in step S830). After application of the transformation matrix to the image, a partially-corrected image that is less distorted (and perhaps substantially free of perspective or geometric distortions) is obtained. This approach generates a correction factor to each calibration mark to correct for distortion.

FIG. 9 depicts another approach 900 for distortion correction. Unlike the first approach using the empirically-generated transformation matrix, this second approach entails correcting the image for lens distortion and perspective distortion. Using the calibration mark object array described above and regions of the image referenced by the calibration mark object array at steps S910 and S920, distortion coefficients are obtained. For example, a method described in the calibration method of Z. Zhang as described in "A flexible new technique for camera calibration," *IEEE Transaction on Pattern Analysis and Machine Intelligence*, 22(11):1330-1334, 2000, which is incorporated by reference herein, may be used. The method described in Zhang uses a checkerboard pattern to obtain calibration parameters that can be used in subsequent photographs. For the inventive concept disclosed herein, however, the calibration pattern extracted from the image as described above is used. The calibration result obtained will include the lens distortion parameters as $k_1$ and $k_2$.

The technique proposed by Zhang uses the camera to observe a planar pattern shown at a few (at least two) different orientations. The pattern can be printed on a laser printer and attached to a "reasonable" planar surface (e.g., a hard book cover). Either the camera or the planar pattern may be moved and it is not necessary for the details of the motion to be known. The proposed approach lies between the photogrammetric calibration and self-calibration because 2D metric information is used rather than 3D or purely implicit one. Both computer simulation and real data have been used to test the technique. The technique described herein advances 3D computer vision from laboratory environments to the real world.

Constraints on the camera's intrinsic parameters are provided by observing a single plane. A 2D point is denoted by $m=[u,v]^T$. A 3D point is denoted by $M=[X, Y, Z]^T$. The symbol $\tilde{}$ denotes the augmented vector by adding 1 as the last element: $\tilde{m}=[u, v, 1]^T$ and $\tilde{M}=[X, Y, Z, 1]^T$. A camera is modeled by the usual pinhole: the relationship between a 3D point M and its image projection m is given by:

$$s\tilde{m}=A[R\ t]\tilde{M} \qquad \text{Equation (1)}$$

where s is an arbitrary scale factor; (R, t), called the extrinsic parameters, is the rotation and translation which relates the world coordinate system to the camera coordinate system; and A, called the camera intrinsic matrix, is given by:

$$A = \begin{bmatrix} \alpha & \gamma & u0 \\ 0 & \beta & v0 \\ 0 & 0 & 1 \end{bmatrix}$$

with ($u_0$, $v_0$) the coordinates of the principal point, $\alpha$ and $\beta$ the scale factors in image u and v axes, and $\gamma$ the parameter describing the skewness of the two image axes. The abbreviation $A^{-T}$ is used to represent $(A^{-1})^T$ or $(A^T)^{-1}$.

The model plane may be assumed as being on Z=0 of the world coordinate system. The $i^{th}$ column of the rotation matrix R will be denoted as $r_i$. From Equation (1), we have:

$$s\begin{bmatrix} u \\ v \\ 1 \end{bmatrix} = A[r_1\ r_2\ r_3\ t]\begin{bmatrix} X \\ Y \\ 0 \\ 1 \end{bmatrix}$$

-continued $$= A[r_1 \ r_2 \ t]\begin{bmatrix} X \\ Y \\ 1 \end{bmatrix}.$$

The symbol M is still used to denote a point on the model plane, but $M=[X, Y]^T$ since Z is equal to 0. In turn, $\tilde{M}=[X, Y, 1]^T$. Therefore, a model point M and its image m is related by a homography H:

$$s\tilde{m}=H\tilde{M} \quad \text{with } H=A[r_1 \ r_2 \ t]. \qquad \text{Eq. (2)}$$

As is clear, the 3×3 matrix H is defined up to a scale factor.

Given an image of the model plane, a homography can be estimated. Denoting the homography by $H=[h_1 \ h_2 \ h_3]$, from Equation (2), we have $$[h_1 \ h_2 \ h_3]=\lambda A[r_1 \ r_2 \ t]$$

where $\lambda$ is an arbitrary scalar. Using the knowledge that $r_1$ and $r_2$ are orthonormal, the following constraints are obtained:

$$h_1^T A^{-T} A^{-1} h_2 = 0 \qquad \text{Eq. (3)}$$

$$h_1^T A^{-T} A^{-1} h_1 = h_2^T A^{-T} A^{-1} h_2 \qquad \text{Eq. (4)}$$

These are the two basic constraints on the intrinsic parameters, given one homography. Because a homography has 8 degrees of freedom and there are 6 extrinsic parameters (3 for rotation and 3 for translation), 2 constraints are obtained on the intrinsic parameters. The parameter $A^{-T}A^{-1}$ actually describes the image of the absolute conic. A geometric interpretation will now be provided.

The model plane, under the convention used herein, is described in the camera coordinate system by the following equation:

$$\begin{bmatrix} r_3 \\ r_3^T t \end{bmatrix}^T \begin{bmatrix} x \\ y \\ z \\ w \end{bmatrix} = 0,$$

where w=0 for points at infinity and w=1 otherwise. This plane intersects the plane at infinity at a line, and we can easily see that $$\begin{bmatrix} r_1 \\ 0 \end{bmatrix}$$

and $$\begin{bmatrix} r_2 \\ 0 \end{bmatrix}$$

are two particular points on that line. Any point on it is a linear combination of these two points, i.e., $$x_\infty = a\begin{bmatrix} r_1 \\ 0 \end{bmatrix} + b\begin{bmatrix} r_2 \\ 0 \end{bmatrix} = \begin{bmatrix} ar_1 + br_2 \\ 0 \end{bmatrix}.$$

Computing the intersection of the above line with the absolute conic, and knowing that by definition, the point $x_\infty$ (the circular point) satisfies $x_\infty^T x_\infty = 0$, i.e., $$(ar_1+br_2)^T(ar_1+br_2)=0, \text{ or } a^2+b^2=0.$$

The solution is $b=\pm ai$, where $i^2=-1$. That is, the two intersection points are $$x_\infty = a\begin{bmatrix} r_1 \pm ir_2 \\ 0 \end{bmatrix}.$$

Their projection in the image plane is then given, up to a scale factor, by $$\tilde{m}_\infty = A(r_1 \pm ir_2) = h_1 \pm ih_2.$$

Point $\tilde{m}_\infty$ is on the image of the absolute conic, described by $A^{-T}A^{-1}$. This gives $$(h_1 \pm ih_2)^T A^{-T} A^{-1}(h_1 \pm ih_2)=0.$$

requiring that both real and imaginary parts be zero yields (3) and (4).

The details on how to effectively solve the camera calibration problem will now be provided. An analytical solution will be presented, followed by a nonlinear optimization technique based on the maximum likelihood criterion. Finally, both analytical and nonlinear solutions will be provided, taking lens distortion into account.

Consider the following Equation (5):

$$B = A^{-T}A^{-1} \equiv \begin{bmatrix} B_{11} & B_{12} & B_{13} \\ B_{12} & B_{22} & B_{23} \\ B_{13} & B_{23} & B_{33} \end{bmatrix}$$

$$= \begin{bmatrix} \frac{1}{\alpha^2} & -\frac{\gamma}{\alpha^2 \beta} & \frac{v_0\gamma - u_0\beta}{\alpha^2 \beta} \\ -\frac{\gamma}{\alpha^2 \beta} & \frac{\gamma^2}{\alpha^2\beta^2}+\frac{1}{\beta^2} & -\frac{\gamma(v_0\gamma - u_0\beta)}{\alpha^2\beta^2} - \frac{v_0}{\beta^2} \\ \frac{v_0\gamma - u_0\beta}{\alpha^2\beta} & -\frac{\gamma(v_0\gamma - u_0\beta)}{\alpha^2\beta^2} - \frac{v_0}{\beta^2} & \frac{(v_0\gamma-u_0\beta)^2}{\alpha^2\beta^2}+\frac{v_0^2}{\beta^2}+1 \end{bmatrix}.$$

Noting that B is symmetric and defined by a 6D vector $$b=[B_{11},B_{12},B_{22},B_{13},B_{23},B_{33}]^T. \qquad \text{Equation (6)}$$

Let the ith column vector of H be $hi=[h_{i1}, h_{i2}, h_{i3}]^T$. Then, we have $$h_i^T B h_j = v_{ij}^T b \qquad \text{Equation (7)}$$

with $$v_{ij}=[h_{i1}h_{j1}, h_{i1}h_{j2}+h_{i2}h_{j1}, h_{i2}h_{j2}, h_{i3}h_{j1}+h_{i1}h_{j3}, h_{i3}h_{j2}+h_{i2}h_{j3}, h_{i3}h_{j3}]^T.$$

Therefore, the two fundamental constraints (3) and (4), from a given homography, can be rewritten as 2 homogeneous equations in b, as shown below in Equation (8):

$$\begin{bmatrix} v_{12}^T \\ (v_{11}-v_{22})^T \end{bmatrix} b = 0. \qquad \text{Equation (8)}$$

If n images of the model plane are observed, by stacking n such equations as (8), the result can be expressed as:

$$Vb=0. \qquad \text{Equation (9)}$$

where V is a 2π×6 matrix. If n≥3, generally, a unique solution b defined up to a scale factor is obtained. If n=2, the skewless constraint γ=0, i.e., [0, 1, 0, 0, 0, 0]b=0, can be imposed and added as an additional equation to Equation (9). (If n=1, two camera intrinsic parameters, e.g., α and β, may be solved assuming $u_0$ and $v_0$ are known (e.g., at the image center) and γ=0. The solution to Equation (9) is well-known as the eigenvector of $V^T V$ associated with the smallest eigenvalue (equivalently, the right singular vector of V associated with the smallest singular value).

Once b is estimated, values in camera intrinsic matrix A can be calculated. Once A is known, the extrinsic parameters for each image may be computed. Using Equation (2), for example, the following may be obtained:

$r_1 = \lambda A^{-1} h_1$ $r_2 = \lambda A^{-1} h_2$ $r_3 = r_1 \times r_2$ $t = \lambda A^{-1} h_3$ with $\lambda = 1/\|A^{-1}h_1\| = 1/\|A^{-1}h_2\|$. Due to the presence of noise in data, the so-computed matrix R=[r1, r2, r3] does not satisfy the properties of a rotation matrix.

Suppose there are n images of a model plane and m points on the model plane. Suppose also that the image points are corrupted by independent and identically distributed noise. The maximum likelihood estimate can be obtained by minimizing the following functional:

$\Sigma_{i=1}^{n} \Sigma_{j=1}^{m} \|m_{ij} - \hat{m}(A, R_i, t_i, M_j)\|^2$,  Value (10)

where $\hat{m}$ (A, $R_i$, $t_i$, $M_j$) is the projection of point $M_j$ in image i, according to Equation (2). A rotation R is parameterized by a vector of 3 parameters, denoted by r, which is parallel to the rotation axis and whose magnitude is equal to the rotation angle. R and r are related by the Rodrigues formula. Minimizing Value (10) is a nonlinear minimization problem, which may be solved with the Alevenberg-Marquardt Algorithm. It uses an initial guess of A, {Ri, $t_i$|i=1 . . . n} which can be obtained using the technique described above.

The solutions above do not consider lens distortion of a camera. However, a desktop camera usually exhibits significant lens distortion, especially radial distortion. Now, first two terms of radial distortion will be discussed. It is likely that the distortion function is dominated by the radial components, and especially by the first term.

Let (u, v) be the ideal (distortion-free) pixel image coordinates, and (ŭ, v̆) the corresponding real observed image coordinates. The ideal points are the projection of the model points according to the pinhole model. Similarly, (x, y) and (x̆, y̆) are the ideal (distortion-free) and real (distorted) normalized image coordinates.

$\breve{x} = x + x[k_1(x^2+y^2) + k_2(x^2+y^2)^2]$ $\breve{y} = y + y[k_1(x^2+y^2) + k_2(x^2+y^2)^2]$, where k1 and k2 are the coefficients of the radial distortion. The center of the radial distortion is the same as the principal point. From $\breve{u} = u + (u-u_0)[k_1(x^2+y^2) + k_2(x^2+y^2)^2]$  Equation (11)

$\breve{v} = v + (v-v_0)[k_1(x^2+y^2) + k_2(x^2+y^2)^2]$.  Equation (12)

Estimating Radial Distortion by Alternation.

As the radial distortion is expected to be small, one would expect to estimate the other five intrinsic parameters, using the technique described above reasonably well by simply ignoring distortion. One strategy is then to estimate k1 and k2 after having estimated the other parameters, which will give the ideal pixel coordinates (u, v). Then, from Equations (11) and (12), we have two equations for each point in each image:

$$\begin{bmatrix} (u-u_0)(x^2+y^2) & (u-u_0)(x^2+y^2)^2 \\ (v-v_0)(x^2+y^2) & (v-v_0)(x^2+y^2)^2 \end{bmatrix} \begin{bmatrix} k_1 \\ k_2 \end{bmatrix} = \begin{bmatrix} \breve{u}-u \\ \breve{v}-v \end{bmatrix}.$$

Given m points in n images, we can stack all equations together to obtain in total 2mn equations, or in matrix form as Dk=d, where k=$[k_1, k_2]^T$. The linear least-squares solution is given by $k = (D^T D)^{-1} D^T d$.  Equation (13)

Once $k_1$ and $k_2$ are estimated, one can refine the estimate of the other parameters by solving Equation (10) with $\hat{m}$(A, $R_i$, $t_i$, $M_j$) replaced by Equations (11) and (12). We can alternate these two procedures until convergence.

The convergence of the above alternation technique may be slow. A natural extension to Equation (10) is to estimate the complete set of parameters by minimizing the following functional:

$\Sigma_{i=1}^{n} \Sigma_{j=1}^{m} \|m_{ij} - \hat{m}(A, k_1, k_2, R_i, t_i, M_j)\|^2$,  Value (14)

where $\hat{m}$ (A, $k_1$, $k_2$, $R_i$, $t_i$, $M_j$) is the projection of point Mj in image i according to Equation (2), followed by distortion according to Equations (11) and (12). This is a nonlinear minimization problem, which is solved with the Levenberg-Marquardt Algorithm. A rotation is again parameterized by a 3-vector r, as disclosed above. An initial guess of A and {$R_i$, $t_i$|i=1 . . . n} can be obtained using the technique described above. An initial guess of k1 and k2 can be obtained with the radial distortion solutions described above, or simply by setting them to 0.

At step S930, the lens distortion parameters $k_1$ and $k_2$ are then used on the original image to obtain an image that is corrected for lens distortion. Alternatively, instead of using the image, a particle object array that describes the particle's geometries, may be corrected. The lens distortion parameters k1 and k2 are used to correct the image for lens distortion using the following equations (15) and (16).

Let ($x_{correct}$, $y_{correct}$) represent the correct locations in the image if there were no distortion due to the lens. Then:

$x_{distorted} = x_{correct} + (x_{correct} - u_0)(k_1 r^2 + k_2 r^4)$  (15)

$y_{distorted} = y_{correct} + (y_{correct} - v_0)(k_1 r^2 + k_2 r^4)$  (16)

where $r^2 = (x_{correct} - u_0)^2 + (y_{correct} - v_0)^2$, and $u_0$ and $v_0$ are principal points (i.e., the intersection points of the camera optical axis and image plane).

The lens distortion can then be corrected by warping the recorded bitmap with a reverse distortion. For each pixel in the corrected image, its corresponding location is mapped in the distorted image using equation (15) and (16) above. The section below titled Geometric Image Transformations describes how the two-dimensional image coordinates and the three-dimensional world coordinates are related by a camera's intrinsic parameters (e.g., focal lens, principal points, distortion coefficients) and extrinsic parameters (rotation and translation matrix). For each integer pixel coordinates in the destination (corrected bitmap), trace back to the source (recorded bitmap) and find the corresponding float coordinates, using the surrounding integer pixels to interpolate the float coordinates. Bilinear interpolation may be used in this process.

In Summary, the lens-distortion correction procedure proposed here, part of which incorporate Zhang's technique, is as follows:

1) Print a pattern and attach it to a planar surface;
2) Take a few images of the model plane under different orientations by moving either the plane or the camera;
3) Detect the feature points in the images;
4) Estimate the five intrinsic parameters and all the extrinsic parameters using the closed-form solution provided above;
5) Estimate the coefficients of the radial distortion by solving the linear least-squares Equation (13);
6) Refine all parameters by minimizing Value (14); at this point, k1 and k2 have assigned values;
7) Use Equations (15) and (16) below and the width and height of the lens distorted image, to find the height and width of the image that is free of lens distortion. Use a scalar to keep the two images at the same width, and scale height accordingly; and
8) For each pixel in the image that is free of lens distortion, find its corresponding location using Equations (15) and (16) in the image that has lens distortion, and apply Shepard's interpolation of nearby neighbors in the distorted image to get the color information for the corrected image.

At step S940, correction for perspective distortion may be achieved using the four corner points of a rectangular calibration mark to solve the homology H using the following process:

Suppose we have a point in world coordinates $$\begin{bmatrix} x^{world} \\ y^{world} \end{bmatrix}$$

and we write this in homogeneous coordinates as $$\begin{bmatrix} kx^{world} \\ ky^{world} \\ k \end{bmatrix}.$$

Similarly, the corresponding point in image coordinates is $$\begin{bmatrix} x^{img} \\ y^{img} \end{bmatrix},$$

and we write this in homogenous coordinates as $$\begin{bmatrix} k'x^{img} \\ k'y^{img} \\ k' \end{bmatrix}.$$

The relationship between these two can be expressed in the following equation:

$$\begin{bmatrix} k'x^{img} \\ k'y^{img} \\ k' \end{bmatrix} = H \begin{bmatrix} kx^{world} \\ ky^{world} \\ k \end{bmatrix}$$

where $$H = \begin{bmatrix} H_{11} & H_{12} & H_{13} \\ H_{21} & H_{22} & H_{23} \\ H_{31} & H_{32} & 1 \end{bmatrix}$$

is the Homography we want to solve.

Expanding both sides of the equation using matrix multiplication, we get:

$$kx^{img} = k(H_{11}x^{world} + H_{12}y^{world} + H_{13})$$

$$k^3 y^{img} = k(H_{21}x^{world} + H_{22}y^{world} + H_{23})$$

$$k^1 = k(H_{31}x^{world} + H_{32}y^{world} + 1)$$

Plug in the third equation to the first two, we get two equations from this pair of points:

$$x^{img} = H_{11}x^{world} + H_{12}x^{world} + H_{13} - H_{21}x^{img}x^{world} - H_{32}x^{img}y^{world}$$

$$y^{img} = H_{21}x^{world} + H_{22}y^{world} + H_{23} - H_{31}y^{img}x^{world} - H_{22}y^{img}y^{world}$$

Since there are eight unknowns in H, we need 4 pairs of points to solve H. We write the eight equations in matrix form:

$$\begin{bmatrix} x_0^{img} \\ y_0^{img} \\ x_1^{img} \\ y_1^{img} \\ x_2^{img} \\ y_2^{img} \\ x_3^{img} \\ y_3^{img} \end{bmatrix} = \begin{bmatrix} x_0^{world} & y_0^{world} & 1 & 0 & 0 & 0 & -x_0^{img}x_0^{world} & -x_0^{img}y_0^{world} \\ 0 & 0 & 0 & x_0^{world} & y_0^{world} & 1 & -y_0^{img}x_0^{world} & -y_0^{img}y_0^{world} \\ x_1^{world} & y_1^{world} & 1 & 0 & 0 & 0 & -x_1^{img}x_1^{world} & -x_1^{img}y_1^{world} \\ 0 & 0 & 0 & x_1^{world} & y_1^{world} & 1 & -y_1^{img}x_1^{world} & -y_1^{img}y_1^{world} \\ x_2^{world} & y_2^{world} & 1 & 0 & 0 & 0 & -x_2^{img}x_2^{world} & -x_2^{img}y_2^{world} \\ 0 & 0 & 0 & x_2^{world} & y_2^{world} & 1 & -y_2^{img}x_2^{world} & -y_2^{img}y_2^{world} \\ x_2^{world} & y_3^{world} & 1 & 0 & 0 & 0 & -x_3^{img}x_3^{world} & -x_3^{img}y_3^{world} \\ 0 & 0 & 0 & x_3^{world} & y_3^{world} & 1 & -y_3^{img}x_3^{world} & -y_3^{img}y_3^{world} \end{bmatrix} \begin{bmatrix} H_{11} \\ H_{12} \\ H_{13} \\ H_{21} \\ H_{22} \\ H_{23} \\ H_{31} \\ H_{32} \end{bmatrix}$$

Thus, for each image suffers from the projective distortion, we pick four points in this image, and given the world coordinates of these four points, we are able to solve H.

The "k" in the above equation is a scalar for the homogeneous representation of the two-dimensional coordinates, different from the lens coefficients k1, k2. Four points (e.g., four corners where the shape is rectangular) of multiple calibration marks may be used to account for nonuniformity of distortions. The starting point for perspective correction in this approach is not the original image, but the corrected image where lens distortion effects have been removed. The homography H is determined using four points from a set of calibration marks identified in the image corrected for lens distortion, and then is applied to the corrected image to determine a bitmap (the corrected, or true-size, bitmap) that has been corrected for both lens and perspective distortion.

A perspective distortion usually occurs when the camera's optical axis is not perpendicular to the center of the object. Using the image of particles captured on a grid-patterned background, multiple (e.g., five) pairs of orthogonal lines in the scene may be used to find the homography to correct the perspective distortion. This correction will often make parallel lines in the physical world also parallel in the image, orthogonal lines in the physical world also orthogonal in the image, squares in the physical world have unit aspect ratio in the image, and/or circles in the physical world circular in the image.

To summarize the perspective distortion correction process detailed above, the process entails the following steps:
1) Obtain a calibration pattern containing orthogonal lines of known dimensions, disperse particles on the calibration pattern, and capture the image using the same lens;
2) Choose multiple (e.g., five) pairs of orthogonal lines on the image;
3) Solve the homography H between the projection-distorted image and the image that is free of projection distortion;
4) Use H and the width and height of the projection-distorted image to find the height and width of the image that is free of projection distortion. Use a scalar to keep the two images at the same width, and scale height accordingly; and
5) For each pixel in the image that is free of projection distortion, find its corresponding location in the projection-distorted image to get the color information for the correct image.

The lens distortion correction and the projection distortion correction maybe tested separately and cascaded, so that Shepard's interpolation may only be done once.

The method illustrated in FIGS. 8A and 9 may be implemented in a processing device. As discussed with respect to FIG. 5, once the camera 54 captures the image, the data processing of the image can occur using a processor directly connected to the camera 53, alternatively, the image data may be transmitted to a separate processor.

Geometric Image Transformations

This section will now talk about some known image transformation functions that may be used to correct and manipulate the image of the particle. More specifically, the functions in this section perform various geometrical transformations of 2D images. They do not change the image content but deform the pixel grid and map this deformed grid to the destination image. In fact, to avoid sampling artifacts, the mapping is done in the reverse order, from destination to the source. That is, for each pixel (x, y) of the destination image, the functions compute coordinates of the corresponding "donor" pixel in the source image and copy the pixel value:

$$dst(x,y)=src(f_x(x,y),f_y(x,y))$$

In case the forward mapping is specified as $<g_x, g_y>$: src→dst, the functions described below compute the corresponding inverse first mapping, $<f_x, f_y>$:dst→src and then use the above formula.

The actual implementations of the geometrical transformations, from the most generic Remap and to the simplest and the fastest Resize, need to solve two main problems with the above formula.

Extrapolation of non-existing pixels. Similarly to the filtering functions, for some (x, y), either one of $f_x(x, y)$, or $f_y(x, y)$, or both of them may fall outside of the image. In this case, an extrapolation method needs to be used. OpenCV provides the same selection of extrapolation methods as in the filtering functions. In addition, it provides the method Border Transparent. This means that the corresponding pixels in the destination image will not be modified at all.

Interpolation of pixel values. Usually $f_x(x, y)$ and $f_y(x, y)$ are floating-point numbers. This means that $<f_x, f_y>$ can be either an affine or perspective transformation, or radial lens distortion correction, and so on. So, a pixel value at fractional coordinates needs to be retrieved. In the simplest case, the coordinates can be rounded to the nearest integer coordinates and the corresponding pixel can be used. This is called a nearest-neighbor interpolation. However, a better result can be achieved by using more sophisticated interpolation methods, where a polynomial function is fit into some neighborhood of the computed pixel ($f_x(x, y)$, $f_y(x, y)$), and then the value of the polynomial at ($f_x(x, y)$, $f_y(x, y)$) is taken as the interpolated pixel value. In OpenCV, you can choose between several interpolation methods, some of which will be described below.

Get Rotation Matrix 2D

This function calculates an affine matrix of 2D rotation. Some parameters used for this process are as follows:
center—Center of the rotation in the source image.
angle—Rotation angle in degrees. Positive values mean counter-clockwise rotation (the coordinate origin is assumed to be the top-left corner).
scale—Isotropic scale factor.
map_matrix—The output affine transformation, 2×3 floating-point matrix.

The function calculates the following matrix:

$$\begin{bmatrix} \alpha & \beta & (1-\alpha)\cdot center.x - \beta \cdot center.y \\ -\beta & \alpha & \beta \cdot center.x + (1-\alpha)\cdot center.y \end{bmatrix}$$

where $\alpha = scale \cdot \cos angle,$ $\beta = scale \cdot \sin angle$

The transformation maps the rotation center to itself. If this is not the target, the shift should be adjusted.

Get Affine Transform

This function calculates the affine transform from 3 corresponding points. Some parameters used for this process are as follows:
src—Coordinates of triangle vertices in the source image.

dst—Coordinates of the corresponding triangle vertices in the destination image.
mapMatrix—Pointer to the destination 2×3 matrix The function calculates the 2×3 matrix of an affine transform so that:

$$\begin{bmatrix} x'_i \\ y'_i \end{bmatrix} = \text{map\_matrix} \cdot \begin{bmatrix} x_i \\ y_i \\ 1 \end{bmatrix}$$

where $dst(i) = (x'_i, y'_i), src(i) = (x_i, y_i),$ $i = 0, 1, 2$

Get Perspective Transform

This function calculates a perspective transform from four pairs of the corresponding points. Some parameters used for this process are as follows:
    src—Coordinates of quadrangle vertices in the source image.
    dst—Coordinates of the corresponding quadrangle vertices in the destination image.
    mapMatrix—Pointer to the destination 3×3 matrix [A/b]

The function calculates a matrix of a perspective transforms so that:

$$\begin{bmatrix} t_i x'_i \\ t_i y'_i \\ t_i \end{bmatrix} = \text{map\_matrix} \cdot \begin{bmatrix} x_i \\ y_i \\ 1 \end{bmatrix}$$

where $dst(i) = (x'_i, y'_i),$ $src(i) = (x_i, y_i),$ $i = 0, 1, 2, 3$

Get Quadrangle SubPix

This process retrieves a pixel rectangle from an image with sub-pixel accuracy. Some parameters used for this process are as follows:
    src—source image.
    dst—extracted quadrangle
    mapMatrix—the transformation 2×3 matrix [A/b]

This function extracts pixels from src at sub-pixel accuracy and stores them to dst as follows:

$dst(x, y) = src(A_{11}x' + A_{12}y' + b_1, A_{21}x' + A_{22}y' + b_2)$ where $x' = x - \frac{(\text{width}(dst) - 1)}{2},$ $y' = y - \frac{(\text{height}(dst) - 1)}{2}$ and $\text{mapMatrix} = \begin{bmatrix} A11 & A12 & b1 \\ A21 & A22 & b2 \end{bmatrix}$ The values of the pixels at non-integer coordinates are retrieved using bilinear interpolation. When the function needs pixels outside of the image, it uses replication border mode to reconstruct the values. Every channel of multiple-channel images is processed independently.

GetRectSubPix

This function retrieves the pixel rectangle from an image with sub-pixel accuracy.
    src—Source image
    Dst—extracted rectangle
    Center—floating point coordinates of the extracted rectangle center within the source image. The center must be inside the image.

This function extracts pixels from src:

$dst(x,y)=src(x+\text{center}.x-(dst.\text{cols}-1)*0.5, y+\text{center}.y-(dst.\text{rows}-1)*0.5)$ where the values of the pixels at non-integer coordinates are retrieved using bilinear interpolation. Every channel of multiple-channel images is processed independently. While the rectangle center must be inside the image, parts of the rectangle may be outside. In this case, the replication border mode is used to get pixel values beyond the image boundaries.

Log Polar

This function remaps an image to a log-polar space.
    src—Source image
    dst—Destination image
    center—The transformation center; where the output precision is maximal
    M—Magnitude scale parameter.
    flags—A combination of interpolation methods and the following optional flags:
        CV_WARP_FILL_OUTLIERS fills all of the destination image pixels. If some of them correspond to outliers in the source image, they are set to zero
        CV_WARP_INVERSE_MAP See below This function transforms the source image using the following transformation:
    Forward transformation (CV_WARP_INVERSE_MAP is not set):

$dst(\phi,\rho)=src(x,y)$

Inverse transformation (CV_WARP_INVERSE_MAP is set):

$dst(x,y)=src(\phi,\rho)$ where $\rho=M\cdot\log\sqrt{x^2+y^2}, \phi=a\tan(y/x)$ The function emulates the human "foveal" vision and can be used for fast scale and rotation invariant template matching, for object tracking and so forth. The function cannot operate in-place.

Remap

This function applies a generic geometrical transformation to the image.
    src—Source image.
    dst—Destination image.
    mapx—the map of x-coordinates.
    mapy—the map of y-coordinates.
    flags—Interpolation method (see resize ( )). The method INTER_AREA is not supported by this function.
    fillval—a value used to fill outliers This function transforms the source image using the specified map:

$dst(x,y)=src(\text{map}_x(x,y),\text{map}_y(x,y))$ where values of pixels with non-integer coordinates are computed using one of available interpolation methods.

map$_x$ and map$_y$ can be encoded as separate floating-point maps in map$_1$ and map$_2$ respectively, or interleaved floating-point maps of (x, y) in map$_1$, or fixed-point maps created by using ConvertMaps function. The reason one might want to convert from floating to fixed-point representations of a map is that they can yield much faster (~2×) remapping operations. In the converted case, map$_1$ contains pairs (evFloor(x), cvFloor(y)) and map$_2$ contains indices in a table of interpolation coefficients. This function cannot operate in-place.

Resize

This function resizes an image.

src—input image.

dst—output image; it has the size dsize (when it is non-zero) or the size computed from src.size( ) fx, and fy; the type of dst is the same as of src.

interpolation—interpolation method:

INTER_NN—a nearest-neighbor interpolation

INTER_LINEAR—a bilinear interpolation (used by default)

INTER_AREA—resampling using pixel area relation. It may be a preferred method for image decimation, as it gives moire'-free results. But when the image is zoomed, it is similar to the INTER_NN method.

INTER_CUBIC—a bicubic interpolation over 4×4 pixel neighborhood

INTER_LANCZOS4—a Lanczos interpolation over 8×8 pixel neighborhood

To shrink an image, it will generally look best with INTER_AREA interpolation, whereas to enlarge an image, it will generally look best with INTER_CUBIC (slow) or INTER_LINEAR (faster but still looks OK).

WarpAffine

This function applies an affine transformation to an image.

src—source image.

dst—destination image.

mapMatrix—2×3 transformation matrix.

flags–a combination of interpolation methods and the optional flaus:

CV_WARP_FILL_OUTLIERS—fills all of the destination image pixels; if some of them correspond to outliers in the source image, they are set to fillval CV_WARP_INVERSE_MAP indicates that matrix is inversely transformed from the destination image to the source and thus, can be used directly for pixel interpolation. Otherwise, the function finds the inverse transform from mapMatrix.

Filival—a value used to fill outliers

The function warpAffine transforms the source image using the specified matrix:

$$dst(x,y)=src(M_{11}x+M_{12}y+M_{13},M_{21}x+M_{22}y+M_{23})$$

when the flag WARP_INVERSE_MAP is set. Otherwise, the transformation is first inverted with InvertAffineTransform and then put in the formula above instead of M. The function cannot operate in-place.

$$dst(x, y) = src\left(\frac{M_{11}x + M_{12}y + M_{13}}{M_{31}x + M_{32}y + M_{33}}, \frac{M_{21}x + M_{22}y + M_{23}}{M_{31}x + M_{32}y + M_{33}}\right)$$

The function is similar to GetQuadrangleSubPix but they are not exactly the same. WarpAffine requires input and output image have the same data type, has larger overhead (so it is not quite suitable for small images) and can leave part of destination image unchanged. While GetQuadrangleSubPix may extract quadrangles from 8-bit images into floating-point buffer, has smaller overhead and always changes the whole destination image content. The function cannot operate in-place.

WarpPerspective

This function applies a perspective transformation to an image. Parameters useful for this function include the following:

Src—Source image

Dst—Destination image mapMatrix—3×3 transformation matrix flags—A combination of interpolation methods and the following optional flags:

CV_WARP_FILL_OUTLIERS—fills all of the destination image pixels; if some of them correspond to outliers in the source image, they are set to fillval CV_WARP_INVERSE_MAP—indicates that matrix is inversely transformed from the destination image to the source and, thus, can be used directly for pixel interpolation. Otherwise, the function finds the inverse transform from mapMatrix filval—A value used to fill outliers This function transforms the source image using the specified matrix:

$$\begin{bmatrix} x' \\ y' \end{bmatrix} = mapMatrix \cdot \begin{bmatrix} x \\ y \\ 1 \end{bmatrix}$$

if CV_WARP_INVERSE_MAP is not set $$\begin{bmatrix} x \\ y \end{bmatrix} = mapMatrix \cdot \begin{bmatrix} x' \\ y' \\ 1 \end{bmatrix}$$

otherwise

Note that the function cannot operate in-place.

While some of the embodiments are described in terms of a method or technique, it should be understood that the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments. Such apparatus may include circuits, dedicated and/or programmable, to carry out operations pertaining to embodiments.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments.

For example, the brew parameter database may be stored in a computer readable medium and accessed directly with computer-readable instructions stored on the computer readable medium, or via computer-readable instructions provided through an internet connection, or some combination thereof. Additionally, the workflow through the nodes may be accomplished, for example, on a general purpose computer or on a dedicated computing device integrated with the device to grind and brew coffee.

What is claimed is:

1. A method for controlling brewing of a coffee drink, the method comprising:
   receiving, with a processor, an identifier for the coffee drink, wherein the identifier is associated with a brew parameter used to make the coffee drink, wherein the brew parameter includes a size of grounds of coffee beans;
   setting, with the processor, a grinder to a first setting based on the size of the grounds of the coffee beans of the brew parameter;
   grinding the coffee beans with the grinder set to the first setting to produce first ground coffee beans;
   obtaining, with the processor, an image of a calibration mark and a portion of the first ground coffee beans, and determining, with the processor, a ground size of the first ground coffee beans based on the calibration mark;
   setting, with the processor, the grinder to a second setting based on the size of the ground of the coffee beans associated with the identifier and the determined ground size of the first ground coffee beans; and
   grinding the first ground coffee beans with the grinder set to the second setting to produce second ground coffee beans.

2. The method of claim 1,
   wherein the identifier is encoded in a machine-readable medium affixed to a container for transporting the coffee beans in an unground state.

3. The method of claim 2, wherein the encoded machine-readable medium comprises at least one of a barcode, QR code, RFID Tag, and URI code identifier affixed to the container.

4. The method of claim 1, wherein determining the ground size of the first ground coffee beans with the processor includes correcting the image for distortion effects to generate a corrected image, wherein a same correction factor is applied to image data of the first ground coffee beans and the calibration mark.

5. The method of claim 1, wherein the brew parameter including the size of the grounds of the coffee beans includes at least one of a particle diameter distribution, particle area distribution, particle volume distribution, minimum particle size, maximum particle size and standard deviation, and determining the ground size of the ground coffee beans includes determining, for the ground coffee beans, the at least one of the particle diameter distribution, particle area distribution, particle volume distribution, minimum particle size, maximum particle size and standard deviation included in the grind size parameter.

6. The method of claim 1, wherein the brew parameter further includes at least one of a ratio of an amount of water to an amount of ground coffee beans, a temperature of the water, an amount of time the water and ground coffee beans is agitated, an amount of time the water and ground coffee beans steep, an extraction pressure, and a packing pressure for the ground coffee beans.

7. The method of claim 6, the method further comprising sending the brew parameter to an interface, wherein device settings for attaining a particular brew parameter with a device are stored in the database, and wherein the device is an extraction unit and the interface is connected to a processor controlling the extraction unit, the method further comprising sending settings for the extraction unit associated with the amount of time the water and ground coffee beans are agitated and the amount of time the water and ground coffee beans steep to the processor to control the extraction unit.

8. A non-transitory computer-readable medium storing instructions for controlling brewing of coffee beans for a coffee drink, the instructions comprising instructions for:
   receiving an identifier for the coffee drink, wherein the identifier is associated with a brew parameter wherein the brew parameter includes a size of grounds of the coffee beans;
   sending first instructions to a grinder to set the grinder to a first setting to produce first ground coffee beans according the size of the grounds of the coffee beans of the brew parameter;
   obtaining an image of a portion of the first ground coffee beans, produced by the grinder according to the first instructions, and a calibration mark, and determining a ground size of the first ground coffee beans based on the calibration mark; and
   sending second instructions to the grinder to set the grinder to a second setting to grind the first ground coffee beans to produce second ground coffee beans based on the size of the ground of the coffee beans associated with the identifier and the determined ground size of the first ground coffee beans.

9. The non-transitory computer-readable medium of claim 8,
   wherein the identifier is an encoded machine-readable medium affixed to a container for transporting the coffee beans in an unground state.

10. The non-transitory computer-readable medium of claim 9, wherein the encoded machine-readable medium comprises at least one of a barcode, QR code, RFID Tag, and URI code identifier affixed to the container.

11. The computer-readable medium of claim 8, wherein the brew parameter including the size of the grounds of the coffee beans includes at least one of a particle diameter distribution, particle area distribution, particle volume distribution, minimum particle size, maximum particle size and standard deviation, and determining the ground size of the ground coffee beans includes determining, for the ground coffee beans, the at least one of the particle diameter distribution, particle area distribution, particle volume distribution, minimum particle size, maximum particle size and standard deviation included in the grind size parameter.

* * * * *